US007972213B2

(12) United States Patent
Walker et al.

(10) Patent No.: US 7,972,213 B2
(45) Date of Patent: Jul. 5, 2011

(54) METHOD AND APPARATUS FOR PLAYER COMMUNICATION

(75) Inventors: Jay S. Walker, Ridgefield, CT (US); James A. Jorasch, Stamford, CT (US); Russell P. Sammon, San Francisco, CA (US)

(73) Assignee: IGT, Reno, NV (US)

( * ) Notice: Subject to any disclaimer, the term of this patent is extended or adjusted under 35 U.S.C. 154(b) by 908 days.

(21) Appl. No.: 10/655,969

(22) Filed: Sep. 4, 2003

(65) Prior Publication Data

US 2004/0082384 A1 Apr. 29, 2004

Related U.S. Application Data

(60) Provisional application No. 60/408,472, filed on Sep. 4, 2002.

(51) Int. Cl.
*G06F 17/00* (2006.01)

(52) U.S. Cl. ................. 463/40; 463/16; 463/20; 463/42

(58) Field of Classification Search .................... 463/40, 463/42, 16, 20
See application file for complete search history.

(56) References Cited

U.S. PATENT DOCUMENTS

| | | | | |
|---|---|---|---|---|
| 4,760,527 A | | 7/1988 | Sidley | 364/412 |
| 5,018,021 A | | 5/1991 | Slater | 358/349 |
| 5,179,517 A | | 1/1993 | Sarbin et al. | 364/410 |
| 5,259,613 A | * | 11/1993 | Marnell, II | 463/42 |
| 5,276,312 A | | 1/1994 | McCarthy | 235/380 |
| 5,321,241 A | | 6/1994 | Craine | 235/380 |
| 5,359,182 A | * | 10/1994 | Schilling | 235/380 |
| 5,429,361 A | | 7/1995 | Raven et al. | 273/138 A |
| 5,456,648 A | | 10/1995 | Edinburg et al. | 482/4 |
| 5,655,961 A | | 8/1997 | Acres et al. | 463/27 |
| 5,714,741 A | * | 2/1998 | Pieterse et al. | 235/380 |
| 5,755,621 A | * | 5/1998 | Marks et al. | 463/42 |
| 5,770,533 A | | 6/1998 | Franchi | 463/42 |
| 5,830,067 A | * | 11/1998 | Graves et al. | 463/40 |
| 5,839,960 A | * | 11/1998 | Parra et al. | 463/41 |
| 5,909,486 A | | 6/1999 | Walker et al. | 379/144 |
| 5,971,271 A | * | 10/1999 | Wynn et al. | 235/380 |
| 5,988,346 A | | 11/1999 | Tedesco et al. | 194/217 |
| 6,003,013 A | * | 12/1999 | Boushy et al. | 705/10 |
| 6,012,983 A | * | 1/2000 | Walker et al. | 463/20 |
| 6,068,552 A | * | 5/2000 | Walker et al. | 463/21 |
| 6,113,495 A | * | 9/2000 | Walker et al. | 463/42 |
| 6,116,597 A | | 9/2000 | Rowe et al. | 273/143 R |

(Continued)

FOREIGN PATENT DOCUMENTS

WO WO96/00950 * 1/1996

OTHER PUBLICATIONS

Finnigan, David, "Call Girls Wow 'Em at Gaming Confab", Las Vegas Business Press, Oct. 7, 1991, vol. 8; No. 36; Sec 1; p. 1.*

(Continued)

*Primary Examiner* — Dmitry Suhol
*Assistant Examiner* — Jay Trent Liddle
(74) *Attorney, Agent, or Firm* — K&L Gates LLP

(57) ABSTRACT

Systems and methods are provided for monitoring gaming activities of a player at a gaming device. It is determined, based on the gaming activities, whether to initiate communication between the player and an individual. Communication is enabled between the player and the individual.

15 Claims, 17 Drawing Sheets

U.S. PATENT DOCUMENTS

| | | | | |
|---|---|---|---|---|
| 6,139,431 | A | 10/2000 | Walker et al. | 463/20 |
| 6,186,893 | B1 * | 2/2001 | Walker et al. | 463/20 |
| 6,229,879 | B1 | 5/2001 | Walker et al. | 379/88 |
| 6,234,896 | B1 | 5/2001 | Walker et al. | 463/16 |
| 6,326,104 | B1 * | 12/2001 | Caja et al. | 429/188 |
| 6,327,351 | B1 | 12/2001 | Walker et al. | 379/144.05 |
| 6,527,638 | B1 * | 3/2003 | Walker et al. | 463/25 |
| 6,530,835 | B1 * | 3/2003 | Walker et al. | 463/25 |
| 6,582,310 | B1 | 6/2003 | Walker | |
| 7,101,282 | B2 * | 9/2006 | Walker et al. | 463/25 |
| 7,153,210 | B2 * | 12/2006 | Yamagishi | 463/39 |
| 2002/0098888 | A1 | 7/2002 | Rowe et al. | 463/39 |
| 2007/0087810 | A1 | 4/2007 | Walker et al. | |

OTHER PUBLICATIONS

"IGT Unveils Promotional Casino Card System at World Gaming Congress & Expo", PR Newswire, Oct. 16, 1995, Section: Financial News.

"Casino Bonus Free Money", (http //www casino-bonus-free-money com/), download date: Sep. 4, 2003.

"Casino Free Chips—Online Casino Bonuses", (http //www casinofreechips com/), download date: Sep. 4, 2003.

"Free Online Casino Money for Free Gambling", (http //www all-online-gambling-casinos com/free_gambling html), download date: Sep. 4, 2003.

"On the Light Side", The Associated Press, May 27, 1989, Section: Domestic News, 2pp.

Finnigan, David, "'Call Girls' Wow 'Em at Gaming Confab", Las Vegas Business Press, Oct. 7, 1991, Section: vol. 8, No. 36, Sec. 1, pg. 1, 2pp.

"Discount Long Distance Digest News—Turn Your Phone Into a Slot Machine—With AT&T", DLD Digest, Mar. 14, 1996, (http //www the digest com/66/66-32 html), 2pp.

"Mirage Resorts, Incorporated Licenses Video Conferencing Technology From C-Phone Corporation; C-Phone Hardware and Software Drives State-of-the-Art Video Customer Service Network in Slot Machines at Treasure Island", PR Newswire, Jan. 15, 1997, Section: Financial News, 2pp.

Curtis, Anthony, "MGM, WWF put off major developments", The San Diego Union-Tribune, Feb. 18, 2001, Section: Travel, p. D-10, 2pp.

"Fruit Machine free java mobile phone games game download", (http //www themobilegamer co uk/fruitmachine htm), download date: Sep. 3, 2003, 3pp.

"Gambling for Minutes", (http //www halfbakery com/idea/Gambling_20for_20Minutes), download date: Sep. 3, 2003, 1 pp.

"Gecko Casino—on line casino gaming with free cash bonuses", (http //www greenbaycasino com/casinos/gecko_casino htm), download date: Sep. 3, 2003, 3pp.

Dukart, James, "Whole New Ball Game", (http //www phoneplusmag com/articles/081feat2 html), download date: Sep. 3, 2003, 7pp.

Office Action for U.S. Appl. No. 10/322,107 dated Apr. 11, 2003, 4pp.

Office Action for U.S. Appl. No. 10/322,107 dated Jan. 29, 2004, 5pp.

Office Action for U.S. Appl. No. 10/322,107 dated Sep. 30, 2004, 3pp.

Office Action for U.S. Appl. No. 09/641,903 dated Jan. 10, 2002, 9pp.

Interview Summary for U.S. Appl. No. 09/641,903 dated Sep. 17, 2002, 3pp.

Notice of Allowability for U.S. Appl. No. 09/641,903 dated Sep. 23, 2002, 1pp.

Office Action for U.S. Appl. No. 08/821,437 dated Mar. 22, 2007, 7pp.

Office Action for U.S. Appl. No. 10/655,154 dated Aug. 8, 2007, 6pp.

Office Action for U.S. Appl. No. 08/821,437 dated Dec. 3, 1998, 10pp.

Notice of Allowability for U.S. Appl. No. 08/821,437 dated May 15, 2000, 1pp.

Notice of Allowability for U.S. Appl. No. 08/821,437 dated Aug. 30, 1999, 1pp.

Examiner Communication for U.S. Appl. No. 08/821,437 dated Oct. 1, 1999, 1pp.

* cited by examiner

500

| | PLAYER IDENTIFIER 510 | NAME 520 | COMP POINTS 530 | CURRENT ACTIVITY 540 | NOTES 550 |
|---|---|---|---|---|---|
| 555 | PLAYER-1-02834555 | ANNE RED | 1,846 POINTS | OPERATING SLOT MACHINE #12 | ENJOYS TRAVELLING, HAS VISITED MEXICO THREE TIMES IN LAST YEAR |
| 560 | PLAYER-2-02834555 | JEFF YELLOW | 8,902 POINTS | OPERATING VIDEO POKER MACHINE #57 | AGE 66, RETIRED MECHANICAL ENGINEER, LOVES GADGETS |
| 565 | PLAYER-3-02834555 | JIM BLUE | 579 POINTS | OPERATING SLOT MACHINE #81 | AGE 27, AVID READER OF SCIENCE FICTION BOOKS AND COMIC BOOKS |
| 570 | PLAYER-4-02834555 | ANONYMOUS | N/A | OPERATING SLOT MACHINE #175 | N/A |
| 575 | PLAYER-5-02834555 | JOHN GREEN | 2,984 POINTS | OPERATING COMP KIOSK #82 | JUST BOUGHT A NEW HOUSE, HAS A SIX MONTH OLD BABY |
| 580 | PLAYER-6-02834555 | MARY PURPLE | 3,371 POINTS | PLAYING AT BLACKJACK TABLE #23, POSITION #2 | AGE 25, ENJOYS MOUNTAIN BIKING, DRIVES A 1983 TOYOTA TERCEL |

FIG. 5

600

| | CASINO REP IDENTIFIER 610 | NAME OF CASINO REP 620 | SPECIALTY / TRAINING 630 | CURRENT ACTIVITY 640 |
|---|---|---|---|---|
| 645 | C-REP-1-14379051 | ALICE | PRESENTING OFFERS AND BONUSES TO PLAYERS | ASSISTING PLAYER-1-02834555 |
| 650 | C-REP-2-14379051 | BOB | REMOTE ALTERATIONS TO GAME MACHINES; TYPES 80 WORDS PER MINUTE | ASSISTING PLAYER-2-02834555 |
| 655 | C-REP-3-14379051 | CARL | INSTRUCTION AND EDUCATION ABOUT BONUS ROUND MACHINES | ASSISTING PLAYER-4-02834555 |
| 660 | C-REP-4-14379051 | DIANA | SPEAKS SPANISH FLUENTLY, CUSTOMER ACQUISITION OFFERS | NOT BUSY |
| 665 | C-REP-5-14379051 | EDWARD | OFFERS RELATING TO TABLE GAMES, OFFERS TO WEALTHY PLAYERS | ASSISTING PLAYER-6-02834555 |
| 670 | C-REP-6-14379051 | FRED | CONFLICT MANAGEMENT, DEALING WITH ANGRY PLAYERS | NOT BUSY |

FIG. 6

700

| | TIME WHEN TRIGGER OCCURRED 710 | TRIGGER THAT CAUSED PLAYER TO BE SELECTED 720 | PLAYER IDENTIFIER 730 |
|---|---|---|---|
| 740 | 1:30PM 6/3/2002 | PLAYER INDICATED THAT HE WOULD LIKE TO EARN MORE CREDITS | PLAYER-1-02834555 |
| 750 | 1:32PM 6/3/2002 | PLAYER INSERTED $50 BILL INTO VIDEO POKER MACHINE AND PLAYER HAS AT LEAST 5000 COMP POINTS | PLAYER-2-02834555 |
| 760 | 1:35PM 6/3/2002 | PLAYER REQUESTED A TOUR OF SLOT MACHINE | PLAYER-4-02834555 |
| 770 | 1:35PM 6/3/2002 | CURRENT TIME OF DAY IS AFTER 6PM, AT LEAST 30 HOTEL ROOMS ARE UNOCCUPIED, AND PLAYER IS NOT STAYING AT THE HOTEL | PLAYER-5-02834555 |
| 780 | 1:37PM 6/3/2002 | PIT BOSS INDICATED THAT PLAYER SHOULD RECEIVE AN OFFER | PLAYER-6-02834555 |

FIG. 7

800

| | COMMUNICATION DEVICE 810 | DESCRIPTION OF COMMUNICATION 820 | PLAYER 830 | CASINO REP 840 |
|---|---|---|---|---|
| 845 | TELEPHONE ON SLOT MACHINE #12 | CASINO REP OFFERS PLAYER 100 CREDITS TO SIGN UP FOR A NEW CREDIT CARD | PLAYER-1-02834555 | C-REP-1-14379051 |
| 850 | CELLULAR PHONE BELONGING TO PLAYER-2-02834555 | CASINO REP OFFERS PLAYER 1 FREE COIN FOR EVERY 2 MINUTES THAT HE KEEPS HIS CREDIT BALANCE ABOVE 200 COINS | PLAYER-2-02834555 | C-REP-2-14379051 |
| 855 | VIDEO PHONE ATTACHED TO SLOT MACHINE #81 | NOT IN USE | N/A | N/A |
| 860 | TOUCH SCREEN AND AUDIO SPEAKER ON SLOT MACHINE #175 | CASINO REP INSTRUCTS PLAYER ON HOW TO OPERATE SLOT MACHINE | PLAYER-4-02834555 | C-REP-3-14379051 |
| 865 | COMP KIOSK #82 | WAITING FOR NEXT AVAILABLE CASINO REP | PLAYER-5-02834555 | UNASSIGNED |
| 870 | PORTABLE PHONE AT BLACKJACK TABLE #23 | CASINO REP OFFERS PLAYER 20 CHIPS FOR AGREEING TO TEST DRIVE A FORD SOMETIME IN THE NEXT 30 DAYS | PLAYER-6-02834555 | C-REP-5-14379051 |

FIG. 8

METHOD AND APPARATUS FOR PLAYER COMMUNICATION

PRIORITY CLAIMS

This application claims the benefit of priority of U.S. Provisional Patent Application Ser. No. 60/408,472, filed Sep. 4, 2002, entitled "METHOD AND APPARATUS FOR PLAYER COMMUNICATION", the entirety of which is incorporated by reference herein for all purposes.

CROSS-REFERENCE TO RELATED APPLICATIONS

The present application is related to U.S. patent application Ser. No. 11/552,793 filed on Oct. 25, 2006 in the name of Walker et al. and entitled "METHOD AND APPARATUS FOR GENERATING DIRECTIVES FOR PERSONNEL".

FIELD OF THE INVENTION

The present invention relates to methods and apparatus for gaming.

BACKGROUND OF THE INVENTION

In general, casinos would like to find new ways to increase revenue and to make a player's experience more enjoyable. Casinos would also like to provide benefits to players in a convenient and cost-effective manner. However, additional services to profitably provide players might be somewhat limited given a player's desires while in the casino (e.g., the desire to only play a certain game). It is also possible, however, that certain players at certain times would favorably respond to different activities. Predicting what state of mind a particular player is in, and thus how receptive that player is, can be difficult to establish based only on, e.g., the player's gaming activities. Nevertheless the opportunity to better serve players is a significant one for casinos.

BRIEF DESCRIPTION OF THE DRAWINGS

FIG. 5 shows one embodiment of a player database stored by the controller.

FIG. 6 shows one embodiment of a casino rep database stored by the controller.

FIG. 7 shows one embodiment of a trigger database stored by the controller.

FIG. 8 shows one embodiment of a communication database stored by the controller.

DETAILED DESCRIPTION OF THE INVENTION

Figure 1A:
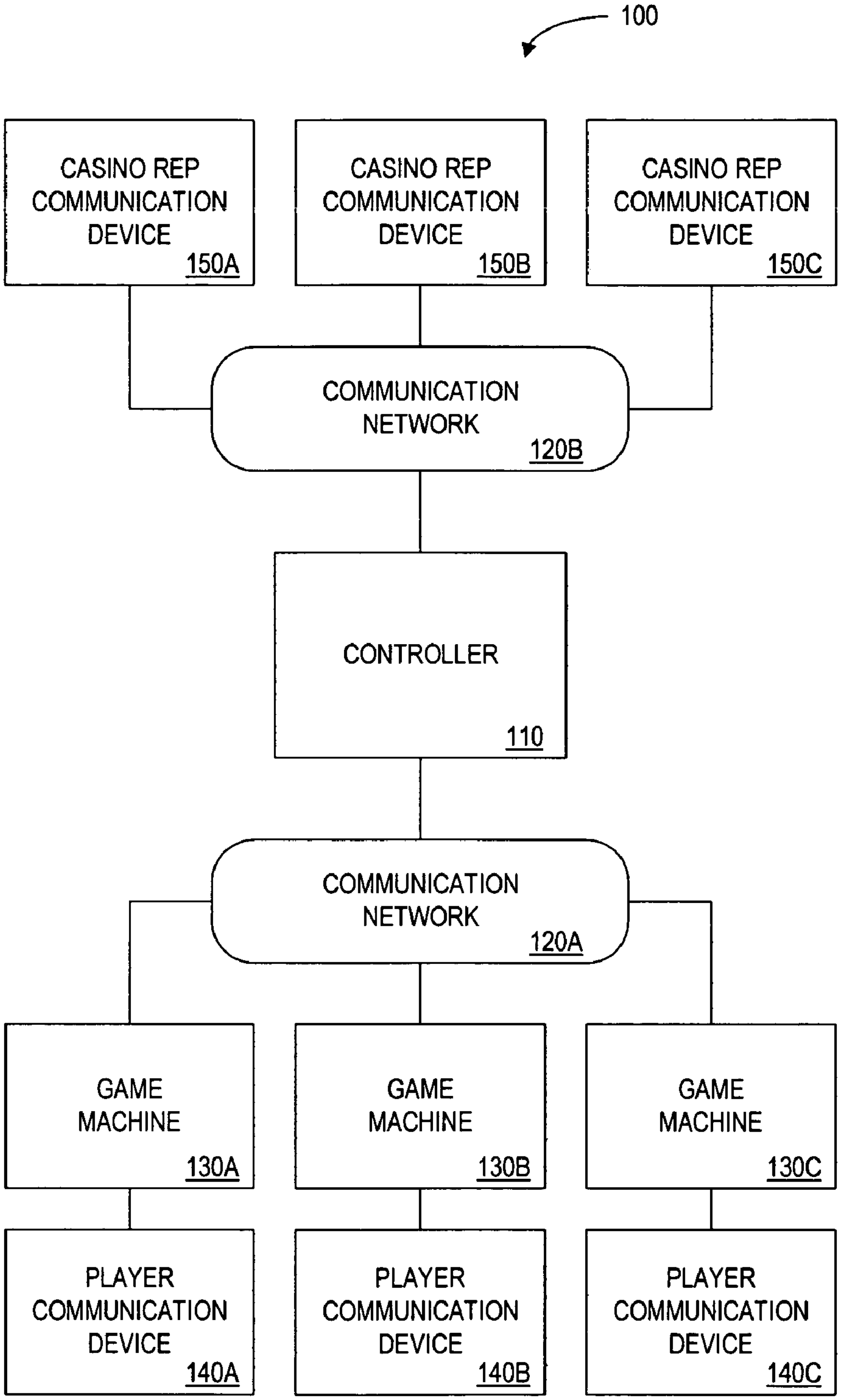
FIG. 1A shows one embodiment of a system that implements the invention.

The present invention is described herein, as are a variety of differing embodiments of the invention.

According to one embodiment, a game machine may include a communication device (e.g., a telephone) that allows a player to communicate with a casino rep. Similarly, a player may provide his own communication device or borrow one from a casino desk. If a player would like to communicate with a casino rep, he may activate the communication device (e.g., by pressing a button or lifting a telephone handset). The player may then use the communication device to communicate with a casino rep (e.g., a call center representative). The casino rep may in turn operate a similar or different communication device to communicate with the player.

According to one embodiment, a casino rep may offer a benefit to a player if the player agrees to perform an activity. For example, a casino rep may offer to increase a player's credit balance on a game machine by 50 credits if the player agrees to sign up for satellite television service.

A variety of other types of communication between a player and a casino rep are also possible. For example, a casino rep may market a product or service to a player, assist a player in operating a game machine, or provide encouragement to a player.

According to one embodiment, a controller may manage communication between players and casino reps. The controller may identify players and casino reps based on a variety of different factors, and then pair them to communicate. For example, the controller may identify a player to receive an offer and a casino rep to present the offer to the player. The controller may then arrange for the casino rep's communication device to be connected to the player's communication device. For example, a telephone on a game machine operated by a player may ring. When the player answers the telephone, a casino rep may explain that the player has been selected to receive an offer and present the offer to the player.

The disclosed combination of casino rep and machine is better than either would be on its own. While computers are generally very good at interpreting data (e.g., a player's session theoretical win), they are not always as adept at interpreting player preferences, feelings, and moods. In contrast, casino reps may be more perceptive regarding player preferences, feelings, and moods and therefore able to determine information that the controller could not determine on its own. In addition, casino reps may gain a more thorough knowledge of a player's preferences by interacting with the player. It is anticipated that relative strengths of the casino reps and the controller will complement each other in determining which offers should be presented to players. Applicants know that people (e.g., players) may be more likely to accept offers that are presented to them by other people (e.g., good-looking waiters or waitresses) than offers that are presented to them by machines (e.g., slot machines).

Players are sometimes very focused when they are gambling at a slot machine. There are times when a player may not want to be disturbed from his current gambling activities in order to respond to an offer. Applicants recognize that people (e.g., waitresses) can be much better at judging this than present-day computer systems. Allow waitresses to cancel an offer based on their own judgment of a player's interest.

In addition, offers have inherent benefits to the player. For example, a player can receive a benefit for performing an activity. In addition, offers have inherent benefits to the casino. Players are happy since they receive benefits, and so players can gamble more because benefits provide an additional source of finds. In addition, offers have inherent benefits to subsidizers. Activities may benefit subsidizers (e.g., players/customers can be acquired at relatively low cost, customer information can be collected). Also, casino reps may themselves benefit by receiving commissions for making offers to players.

The following terms are used herein.

A player is at least one party who operates a game machine.

A casino is a party that enables a player to play a game of chance (e.g., by operating a game machine).

A casino representative (also referred to as a "casino rep") includes an employee of the casino, or other party affiliated with the casino. Examples of casino representatives include hosts, waitresses, coin changers, pit bosses, blackjack dealers, cashiers, bus drivers, flight attendants, and managers.

A communication device includes an electronic device that allows a player to communicate with a casino rep, or vice versa.

A game machine includes an electronic or electromechanical device that is operated by a player to play a game of chance.

A controller includes a computer system operated by the casino, which may enable players to communicate with casino reps.

A trigger includes an event, condition, Boolean expression, or other factor that causes the controller to identify a player to communicate with a casino rep.

An offer includes a description of an activity to be performed by a player and a benefit to be received if this activity is performed.

An activity includes something which may be performed by a player in order to obtain a benefit.

A benefit includes something which may be provided if a player performs an activity.

A subsidizer is a party that provides a subsidy to a casino or other party operating the controller (e.g., in exchange for the player performing an activity).

System

Referring now to FIG. 1A, an apparatus 100 according to embodiments of the present invention includes a controller 110 that is in communication with one or more game machines 130*a*, 130*b* and 130*c*, and with one or more casino representative communication devices 150*a*, 150*b* and 150*c*. Each of one or more player communication devices 140*a*, 140*b* and 140*c* are also in communication with a game machine.

The controller 110 may communicate with the game machines 130*a*, 130*b*, and 130*c*, the player communication devices 140*a*, 140*b* and 140*c* and the casino representative communication devices 150*a*, 150*b* and 150*c* directly or via a communication network of any known type or types. Possible communication networks include: a local area network (LAN), a wide area network (WAN), the Internet, a telephone line, a cable line, a radio channel, an optical communications line, a satellite communications link. In FIG. 1A, such communication is illustrated as taking place through communication networks 120*a* and 120*b*.

Possible communications protocols include: Ethernet, Bluetooth, TCP/IP, 802.11. According to one embodiment, communication may be encrypted to ensure privacy and prevent fraud.

The communication referred to herein can allow any or all of several types of communication to take place. For example, the controller may transmit information to a game machine (e.g., to control its operation), and a game machine may transmit information to the controller (e.g., information about a player's gaming activities)

The controller may transmit information to a communication device, and a communication device may transmit information to the controller. Communication devices may transmit and receive among each other.

Note that both wireline and wireless communication networks are possible. According to one embodiment, a wireless communication network that is used to communicate with a player device may have a limited range (e.g., 10-20 feet).

Transmission frequencies may be reused in different areas of a casino. For example, a first player device may communicate on a frequency band in a first room of casino, and a second player device may communicate on the same frequency band in a second room of the casino. Since the two player devices may be separated by a relatively large distance (e.g., 100 ft), they may not interfere with each other.

Low-power transmissions are not regulated by the FCC, and low-power transmissions do not consume as much power, meaning that player devices may include smaller power supplies or operate for longer periods of time before needing to be recharged.

Each of the game machines 130*a*, 130*b*, and 130*c*, the player communication devices 140*a*, 140*b* and 140*c* and the casino representative communication devices 150*a*, 150*b* and 150*c* may comprise computers, such as those based on the Intel® Pentium® processor, that are adapted to communicate with the controller 110. Any number of the game machines 130*a*, 130*b*, and 130*c*, the player communication devices 140*a*, 140*b* and 140*c* and the casino representative communication devices 150*a*, 150*b* and 150*c* may exist, though three each are illustrated in FIG. 1A.

Examples of game machines include a slot machine (e.g., located in a casino or riverboat), a video poker terminal, a video lottery terminal, a pachinko machine, a table-top game (e.g., located in a bar or other commercial establishment), a personal computer (e.g., to communicate with website that provides gambling services), a telephone (e.g., to communicate with an automated sports book that provides gambling services), a portable handheld gaming device (e.g., a personal digital assistant or Nintendo GameBoy), a skill crane, a skee-ball machine, a video game and a set-top box (e.g., HotelNet).

In embodiments of the invention addressing table games such as blackjack, craps, roulette, poker, baccarat, keno, bingo, and the like, the game machine may be hardware (e.g., a table-top box) located at the game table suitable for tracking events at the game table.

According to one embodiment, a game machine may enable a player to play a game of chance (e.g., bingo). Alternatively, a game machine may enable a player to play a game of skill (e.g., chess).

Game machines are well known to those skilled in the art, and need not be described in further detail herein.

Communication among components may be direct or indirect, such as over the Internet through a Web site maintained by controller 110 on a remote server or over an on-line data network including commercial on-line service providers, bulletin board systems and the like. In yet other embodiments, the devices may communicate with controller 110 over RF, cable TV, satellite links and the like.

Those skilled in the art will understand that devices in communication with each other need not be continually transmitting to each other. On the contrary, such devices need only transmit to each other as necessary, and may actually refrain from exchanging data most of the time. For example, a device in communication with another device via the Internet may not transmit data to the other device for weeks at a time.

The controller 110 may function as a "Web server" that generates Web pages (documents on the Web that typically include an HTML file and associated graphics and script files) that may be accessed via the Web and allows communication with the controller 110 in a manner known in the art.

Any or all of the game machines 130*a,* 130*b,* and 130*c,* the player communication devices 140*a,* 140*b* and 140*c* and the casino representative communication devices 150*a,* 150*b* and 150*c* may be, e.g., conventional personal computers, portable types of computers, such as a laptop computer, a palm-top computer, a hand-held computer, or a Personal Digital Assistant (PDA).

Figure 1B:
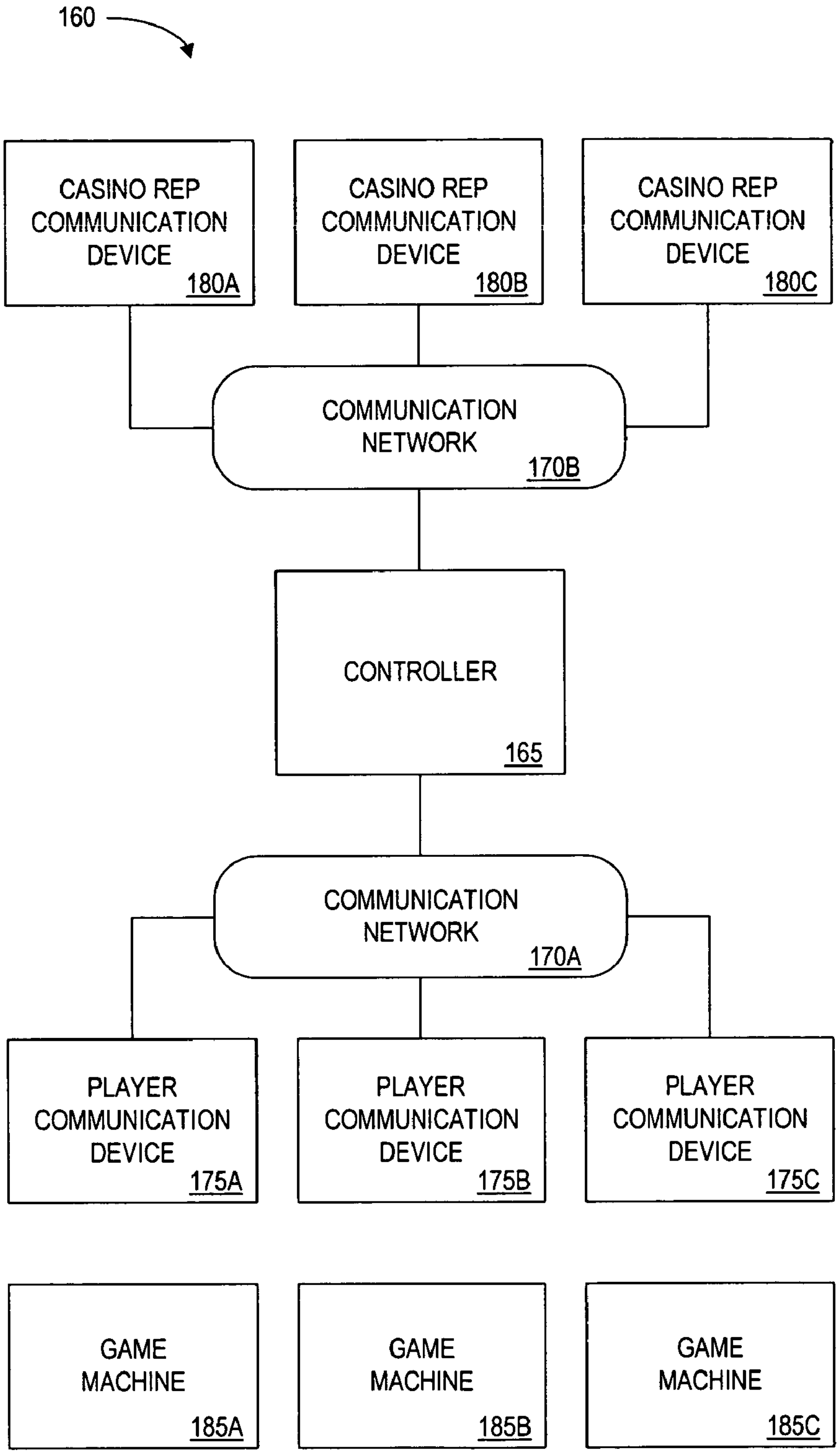
FIG. 1B shows one embodiment of a system that implements the invention.

FIG. 1B depicts another embodiment of a system according to the present invention. FIG. 1B likewise indicates components described above with respect to FIG. 1A. This embodiment depicts player communication devices 175*a* 175*b* and 175*c* in communication with the controller 165 through the communication network 170*a*. The depicted game machines 185*a,* 185*b* and 185*c* are not in communication with the controller 165.

Devices

Figure 2:
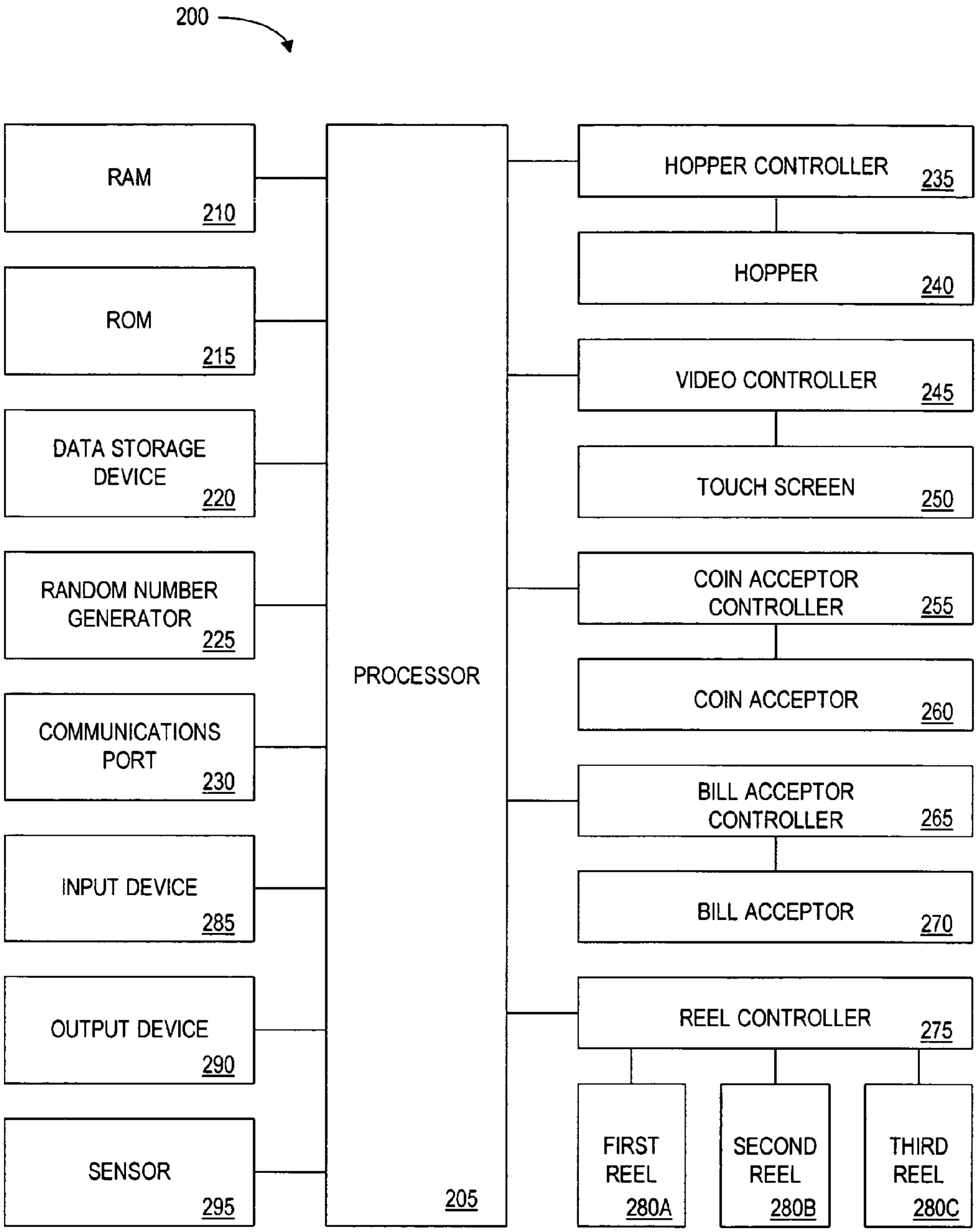
FIG. 2 shows one embodiment of a game machine.

FIG. 2 shows one embodiment 200 of a game machine. This embodiment includes components well known in the art, specifically a processor 205, Ram 210 and ROM 215, a data storage device 220, a random number generator 225, a communication port 230, a hopper controller 235, a hopper 240, a video controller 245, a touch screen 250, a coin acceptor controller 255, a coin acceptor 260, a bill acceptor controller 265, a bill acceptor 270, a reel controller 275, reels 280*a,* 280*b* and 280*c,* an input device 285, an output device 290 and a sensor 295.

The output device 290 may be used to output information from the game machine to a player. Examples of output devices include: a video monitor, a light-emitting diode (LED), an audio speaker, an electric motor, a printer, a coupon or product dispenser, an infra-red port (e.g., for communicating with a second slot machine), a Braille computer monitor, a coin or bill dispenser.

For game machines, common output devices include a cathode ray tube (CRT) monitor on a video poker machine, a bell on a slot machine (e.g., rings when a player wins), an LED display of a player's credit balance on a slot machine, an LCD display of a personal digital assistant (PDA) for displaying keno numbers, a printer to provide a receipt for a player's gambling credits.

The input device 285 may be used to receive an input from a player. Examples of input devices include: a computer keyboard, a computer mouse, a touch screen, a microphone, a video camera, a magnetic stripe reader (e.g., to read a player tracking card), a biometric input device (e.g., a fingerprint or retinal scanner), a radio antenna (e.g., for receiving inputs from a second slot machine), a weight/pressure sensor, a motion sensor, a location sensor (e.g., a global positioning system card), a voice recognition module, a coin or bill acceptor.

For game machines, input devices could include a button or touch screen on a video poker machine, a lever on a slot machine, a magnetic stripe reader to read a player tracking card inserted into a slot machine, a motion sensor to determine if a player is standing in front of a game machine, a keypad (e.g., on a player tracking card reader).

A game machine may include a payment system that accepts payment from a player (e.g., a bet), and/or provides payment to a player (e.g., a prize). Payment is not limited to money but may also include other types of consideration, including products, services, and alternate currencies (e.g., casino chips). Exemplary methods of accepting payment from a player include receiving hard currency (i.e., coins or bills), receiving an alternate currency (e.g., a paper cashless gaming voucher, a coupon, a casino token), receiving a payment identifier (e.g., a credit card number, a debit card number, a player tracking card number), determining that a player has performed a value-added activity.

Exemplary methods of providing payment to a player include dispensing hard currency (i.e., coins or bills), dispensing an alternate currency (e.g., a paper cashless gaming voucher, a coupon, a casino token), crediting a player account (e.g., a bank account or other financial account), providing a product or service to the player (e.g., a jackpot prize may be a new car).

A player may operate multiple game machines. For example, a player may simultaneously play two side-by-side game machines, a player may play a game machine and then continue his gambling session at a video poker machine, and/or a player may use a telephone or other device to remotely operate a game machine.

In an alternate embodiment, a game machine may allow a player to play a game of skill rather than a game of chance. Such an embodiment may be more appealing to certain players or may be permitted in areas where it is illegal to gamble on games of chance.

Figure 3:
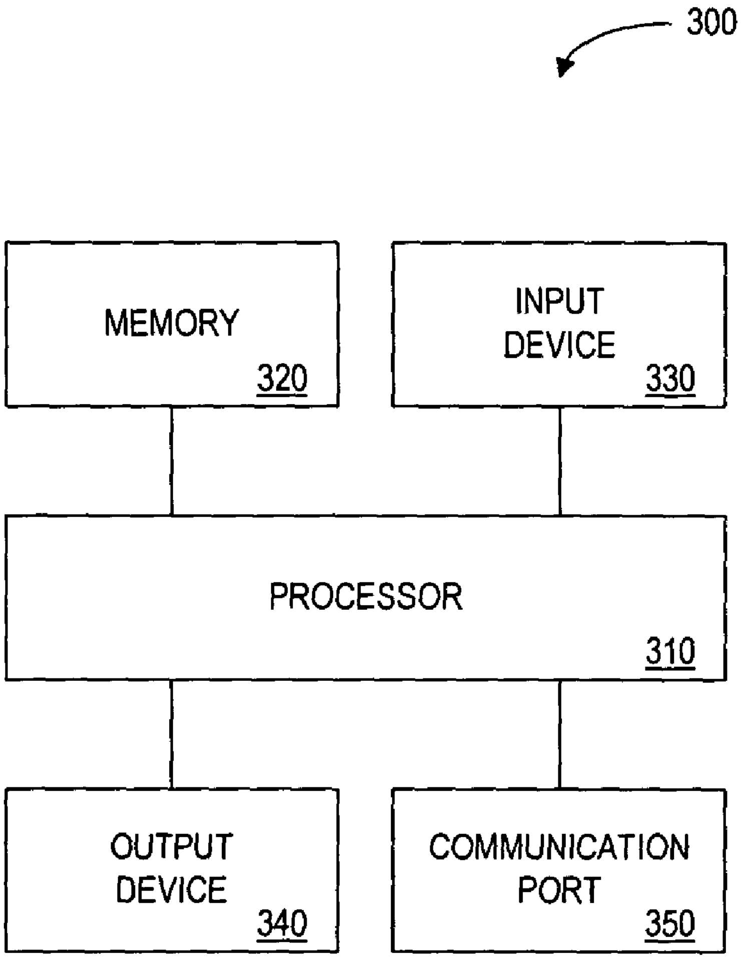
FIG. 3 shows one embodiment of a communication device.

Referring to FIG. 3, an embodiment of a communication device 300 is shown. The communication device 300 includes a processor 310 in communication with a memory 320, an input device 330, an output device 340 and a communication port 350. Each of these components is conventional and further description here is not necessary.

Common input devices include a microphone, a touch screen, a video camera, a motion or location sensor to determine a player's location, a numeric keypad.

For communication devices, common output devices include an audio speaker, a video monitor, and headphones.

The communication device permits a first party (e.g., a player) may use to communicate with a second party (e.g., a casino rep), or vice versa. A player may operate a first communication device and a casino rep may operate a second communication device. These two communication devices may allow them to communicate with each other. Different types of communication devices may be operated by different parties. For example, a player may operate a cellular telephone (a communication device) and a casino rep may operate a computer terminal (a communication device).

Various types of communication devices include a telephone (e.g., a land-line), a cordless telephone, a cellular telephone, a video phone, a computer terminal (e.g., a personal computer, a laptop computer, a dumb terminal), a hands-free telephone, a PDA (personal digital assistant) with network connection, and a one-way or two-way pager.

According to one embodiment, a game machine may include a communication device. For example, a game machine may include a telephone handset that allows a player to communicate with a casino rep. A communication device may be built-into a game machine. For example, a game machine may have a telephone on the side that is marked "Free Money Hotline—pick up this telephone to earn money for gambling!"

A communication device may be added to a game machine. For example, a game machine manufacturer may provide a modification kit that allows a technician to add a communication device to a game machine.

A communication device may be physically connected to a game machine but have no electronic connection. For example, a telephone may be bolted onto the side of a game machine.

A game machine may function as a communication device. For example, an audio speaker and touch screen on a game machine may allow a casino rep to communicate with a player and prompt the player to respond to questions by pressing buttons on the touch screen.

According to one embodiment, a communication device may be portable. For example, a player may be able to carry a communication device with him from game machine to game machine.

A communication device may be wireless or wireline. For example, a player may use a two-way pager to send messages to a casino rep. Wireless communication may be particularly convenient for a casino to set up (there is no need to install wiring), as well as for player to use (a player may be free to move around while operating a communication device). As another example, a player may carry a telephone handset for a land-line telephone. To use the telephone, the player may plug the telephone handset into a telephone jack on the side of a game machine. In some scenarios, this embodiment may be preferred because of lower costs, reduced interference, or increased security in wireline communications.

According to one embodiment, a player may operate his own communication device. For example, a player may use his cellular telephone to communicate with a casino rep. In such an embodiment, the player may identify himself in a variety of different ways, which are described in detail herein. For example, a player may indicate his interest in communicating with a casino rep by dialing a phone number (i.e., to call the casino rep) or by providing his cellular telephone number when filling out a registration form (e.g., so that the casino rep can call the player).

A communication device may permit one or more types of communication, including audio, video, text, images and selection—response interfaces For example, a telephone may allow a player to speak with a casino representative, a video phone may allow a player to see a casino rep with whom he is speaking, a casino rep may use a computer terminal to send an instant message to a player, a casino rep may send the player a snapshot of a product that is specified in an offer, a casino rep may ask a player a question, and the player may then respond to this question by selecting an option on a touch screen.

According to one embodiment, a player may use a communication device to communicate with a casino rep, including providing information to the casino rep. For example, an input device (e.g., a touch screen, a microphone, a video camera) on a communication device may record information from a player. This information may then be transmitted to a casino rep by the communication device.

A player may use a communication device to receive information from the casino rep. For example, an output device (e.g., an audio speaker, a video monitor, headphones) may output information supplied by a casino rep. Similarly, a casino rep may use a communication device to communicate information to a player.

A communication device may be provide unidirectional communication or bi-directional communication. For example, an audio speaker on a game machine may allow a casino rep to output a message to a player, a microphone on a game machine may allow a player to ask a question to a casino rep, telephones may allow a player and a casino rep to converse.

According to one embodiment, a single communication device may be used to simultaneously communicate with a plurality of parties (e.g., like a party line). For example, a player may use a single communication device to simultaneously communicate with a plurality of casino reps who operate a plurality of communication devices. For example, different casino reps may provide different services to a player.

As another example, a casino rep may use a single communication device to communicate with a plurality of players who operate a plurality of communication devices. For example, a casino rep may act as the facilitator for a focus group composed of players operating game machines at a casino.

As another example, a plurality of casino reps operating a plurality of communication devices may communicate with a plurality of players operating a plurality of communication devices.

According to one embodiment, a party (e.g., a casino rep, a player) may operate a plurality of communication devices. Examples include:

As another example, a casino rep may operate a hands-free telephone and a personal computer. The hands-free telephone may enable the casino rep to have a conversation with a player, and the personal computer may allow the casino rep to send instant messages to a player or remotely operate a game machine that the player is using.

As another example, a player may operate a telephone handset and a video phone. The telephone handset may allow the player to speak with a casino rep clearly, and the video phone may allow the casino rep and the player to see each other while conversing.

A communication device may or may not have its own power source. For example, a cordless telephone may include a battery, but a video phone may receive power by being plugged into a power outlet near a game machine.

Figure 4A:
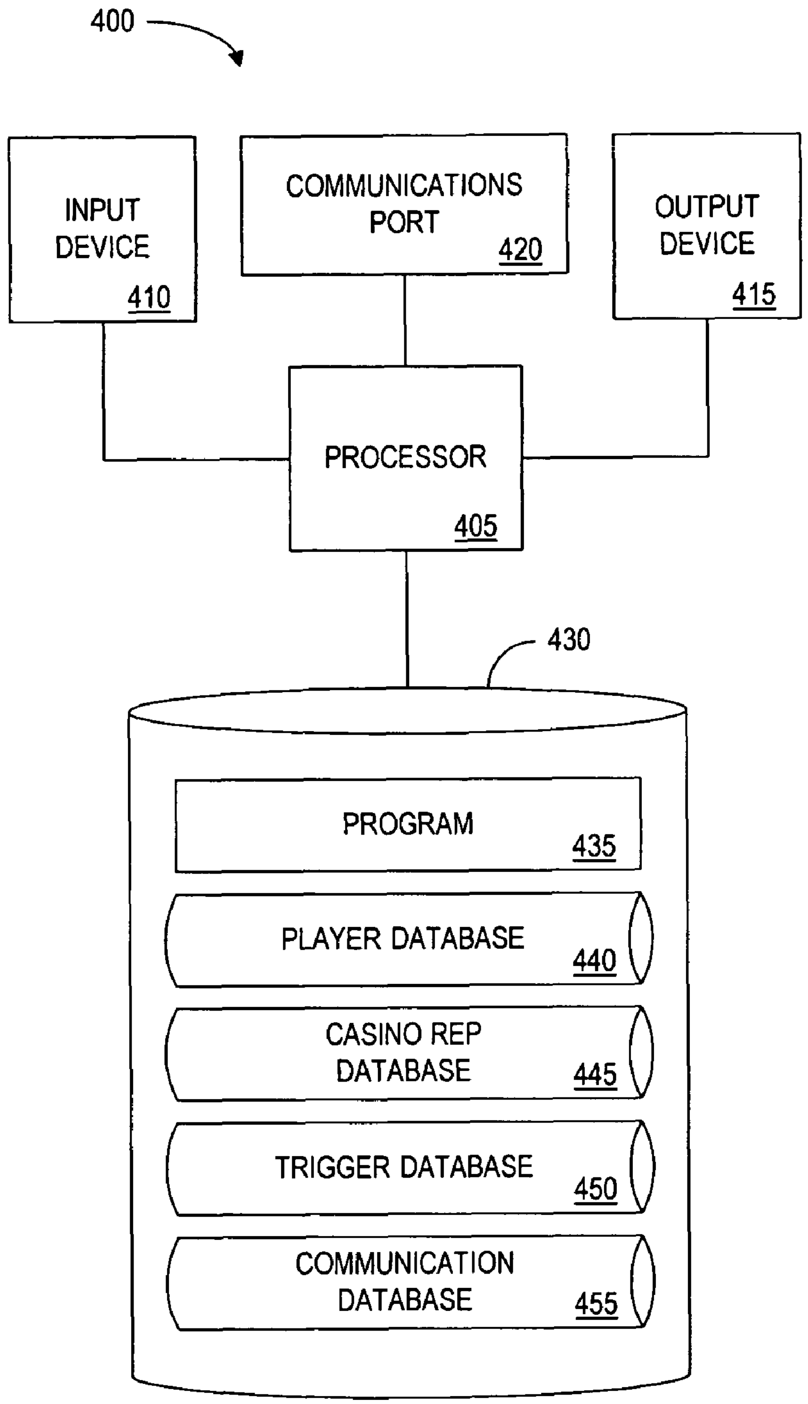
FIGS. 4A and 4B show embodiments of the controller.
Figure 4B:
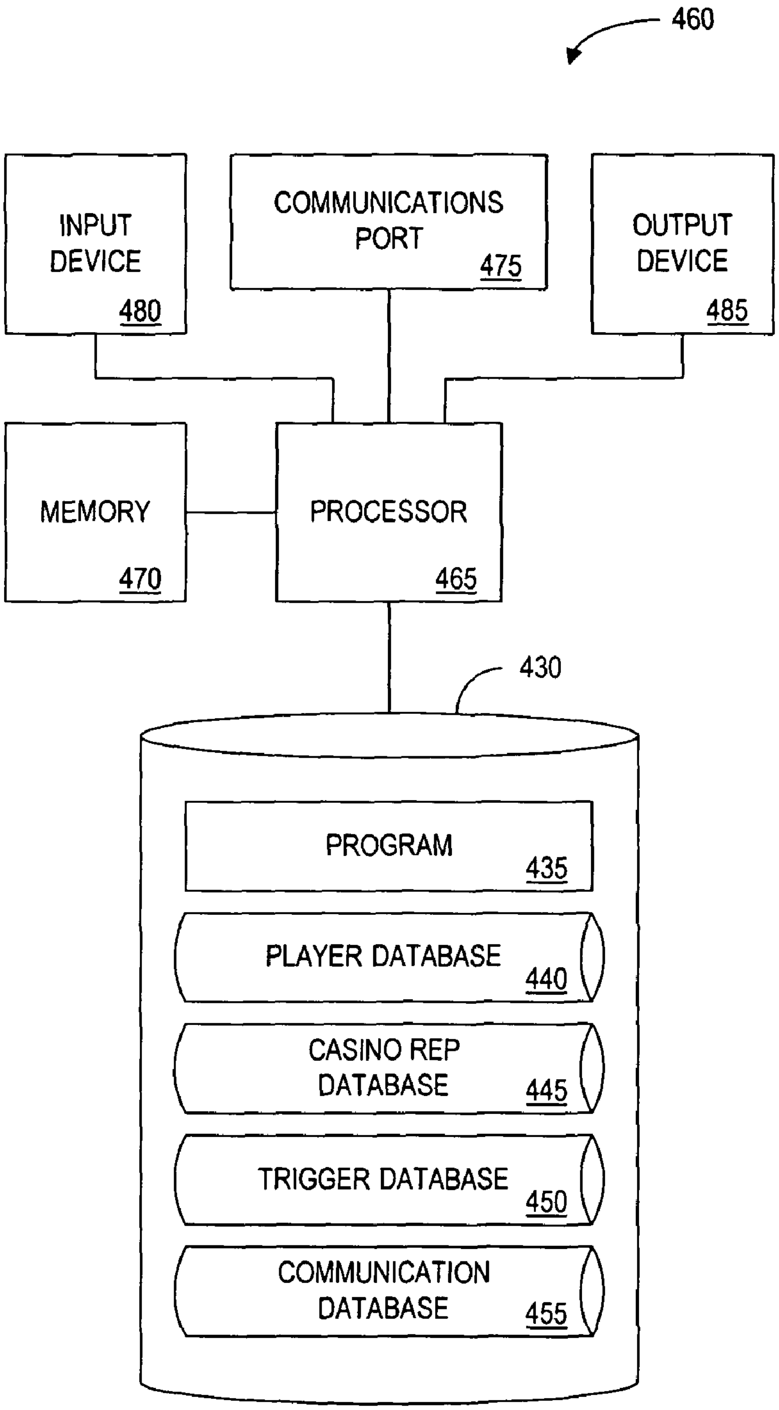

FIGS. 4A and 4B illustrate different embodiments of a controller. Referring to FIG. 4A, controller 400 includes a processor 405 in communication with an input device 410, and output device 415, a communications port 420, and a data storage device 430, each of which is well known in the art. FIG. 4B illustrates comparable components with different figure numerals, and also shows a memory 470 in communication with the processor 465.

With respect to both FIGS. 4A and 4B, the data storage device 430 stores a program 435, as well as a player database 440, a casino rep database 445, a trigger database 450 and a communication database 455.

As will be understood by those skilled in the art, the schematic illustrations and accompanying descriptions of the databases presented herein are exemplary arrangements for stored representations of information. A number of other arrangements may be employed besides those suggested by the tables shown. Similarly, the illustrated entries of the databases represent exemplary information only; those skilled in the art will understand that the number and content of the entries can be different from those illustrated herein.

According to one embodiment, a casino rep may operate a computer terminal (not shown in FIGS. 1A-4B). Such a computer terminal may be useful for a variety of purposes, including outputting information to a casino representative, remotely altering a game machine, identifying a player for communication, identifying a casino rep himself for communication. Examples of computer terminals include a personal computer, a laptop computer, a computer workstation, a dumb terminal, and a personal digital assistant (PDA). According to one embodiment, a computer terminal may communicate with the controller or a game machine using a communication network.

A casino rep may operate both a communication device and a computer terminal. For example, a casino rep may use a hands-free phone while operating a computer terminal. According to one embodiment, a computer terminal may function as a communication device. For example, a personal computer may have a microphone, audio speaker, and video camera that enable it to function as a video phone.

A computer terminal may include a processor, at least one input device (e.g., a keyboard), at least one output device (e.g., a video monitor), and/or at least one communication port (e.g., to communicate with the controller).

Databases

Player Database

FIG. 5 is a tabular representation 500 of the player database. The tabular representation 500 of the database includes a number of example records 555-580 (or entries) each defining a player. Those skilled in the art will understand that the database may include any number of entries. The tabular representation of the database also defines fields for each of the entries or records. The fields specify: (i) a player identifier 510; (ii) a player name 520; (iii) comp points 530 that have been earned by the player; (iv) current activity 540 of the player (e.g., what game machine the player is operating); and (v) notes 550 to store information about the player (e.g., demographic information, player preferences).

Casino Rep Database

FIG. 6 is a tabular representation 600 of the casino rep database. The tabular representation 600 of the database includes a number of example records 645-670 (or entries) each defining a casino rep. Those skilled in the art will understand that the database may include any number of entries. The tabular representation of the database also defines fields for each of the entries or records. The fields specify: (i) a casino rep identifier 610; (ii) a name 620 of the casino rep; (iii) specialty or training 630 of the casino representative (e.g., types of communication the casino rep may be most appropriate for); and (iv) current activity 640 of the casino representative (e.g., whether available to assist a player).

Trigger Database

FIG. 7 is a tabular representation 700 of the trigger database. The tabular representation 700 of the database includes a number of example records 740-780 (or entries) each defining when the controller identifies a player to communicate with a casino rep. Those skilled in the art will understand that the database may include any number of entries. The tabular representation of the database also defines fields for each of the entries or records. The fields specify: (i) a time when the controller identified a player to communicate with a casino rep; (ii) the reason 720 the player was identified (also called "the trigger"); and (iii) the player identifier 730 of the player who was identified.

Communication Database

FIG. 8 is a tabular representation 800 of the communication database. The tabular representation 700 of the database includes a number of example records 845-870 (or entries) each defining a communication between a player and a casino rep. Those skilled in the art will understand that the database may include any number of entries. The tabular representation of the database also defines fields for each of the entries or records. The fields specify: (i) a communication device 810 used in the communication; (ii) a description 820 of the communication; (iii) the player 830 and (iv) the casino rep 840.

Figure 9A:
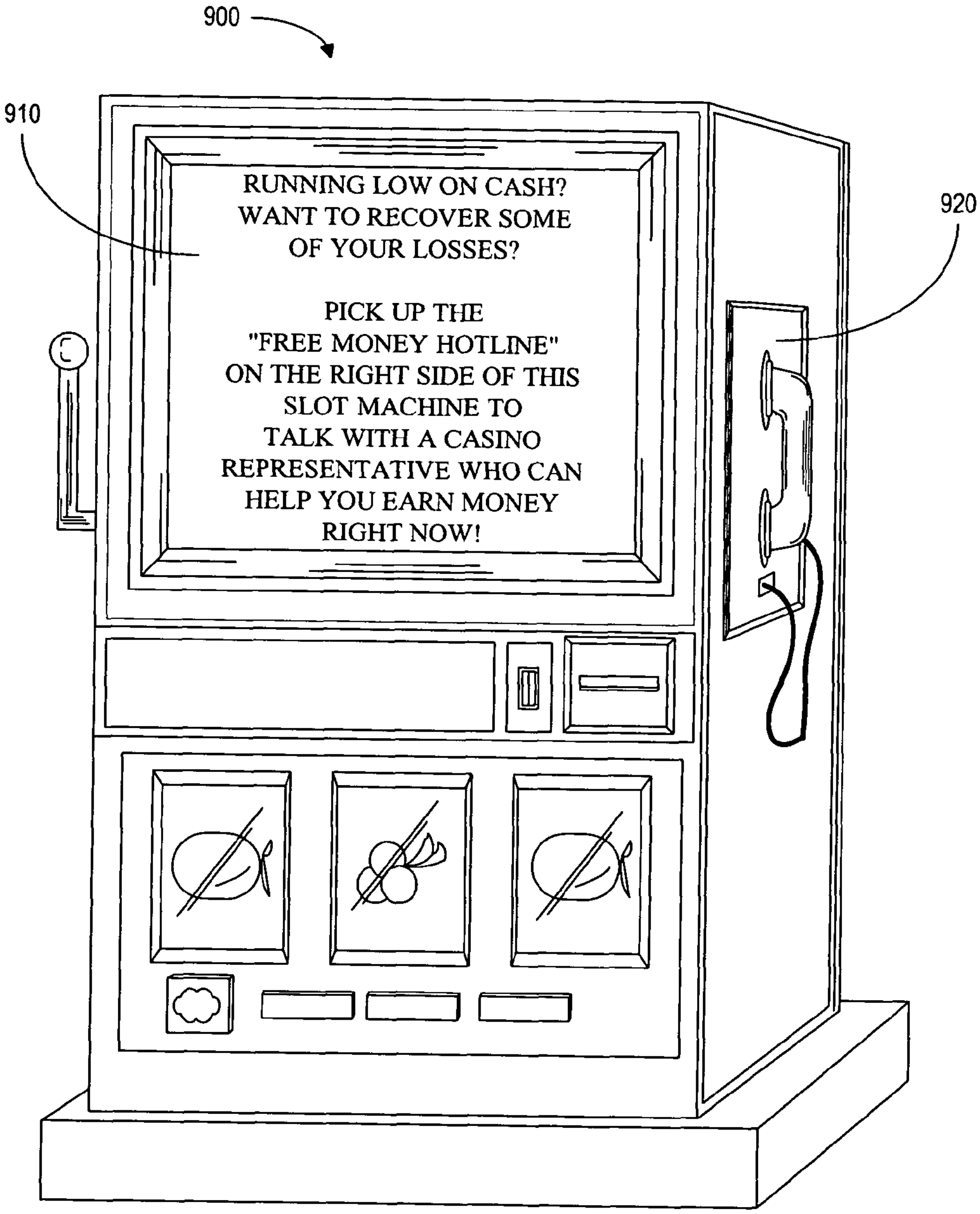
FIG. 9A shows one embodiment of a game machine that includes a communication device.

FIG. 9A shows one embodiment 900 of a game machine that includes a communication device 920. The text on the video screen 910 of the game machine encourages a player to use the communication device 920 to receive an offer from a casino rep.

Figure 9B:
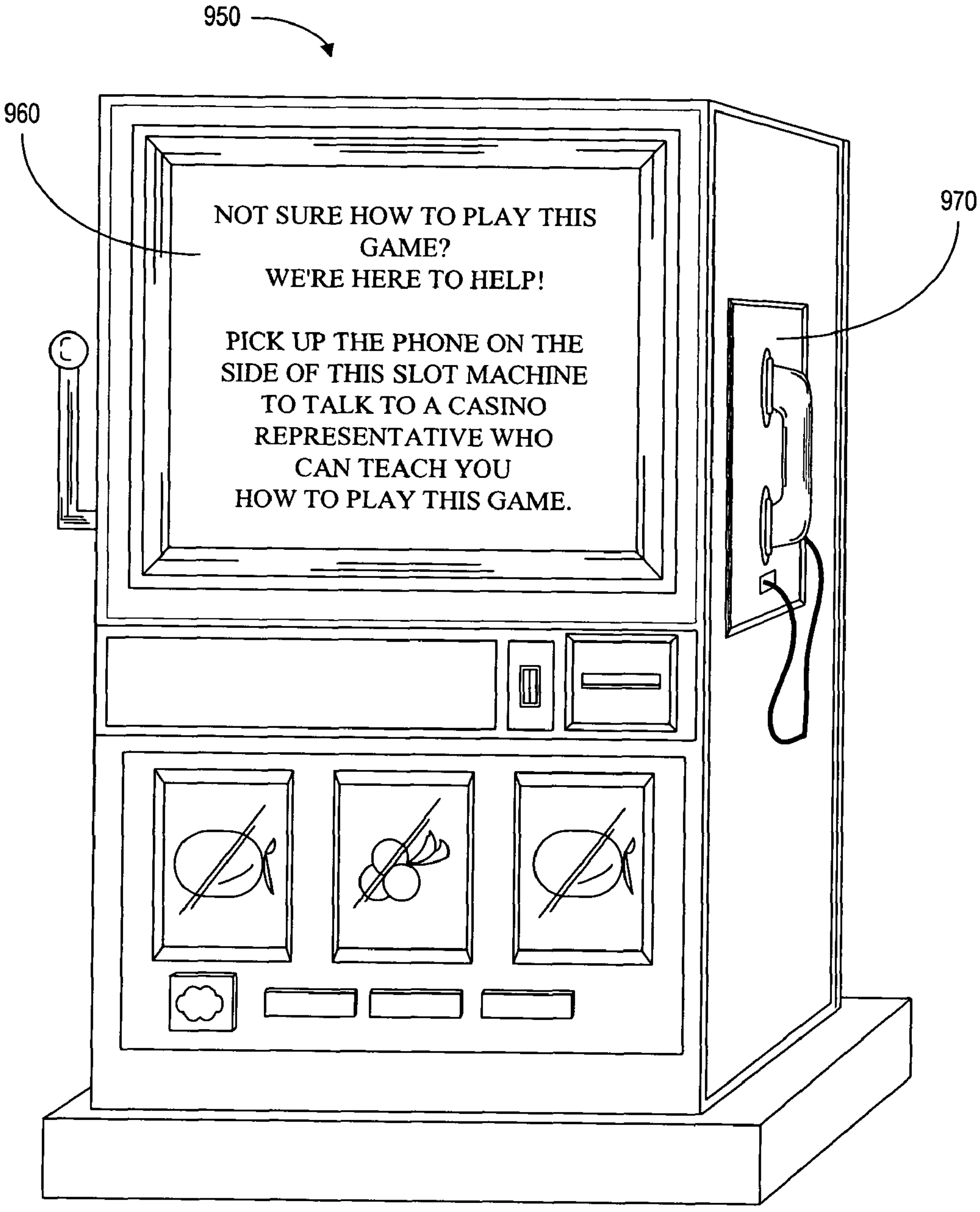
FIG. 9B shows a second embodiment of a game machine that includes a communication device.

FIG. 9B shows a second embodiment 950 of a game machine that includes a communication device 970. The text on the video screen 960 of the game machine encourages a player to use the communication device to receive an instruction from a casino rep.

Figure 10:
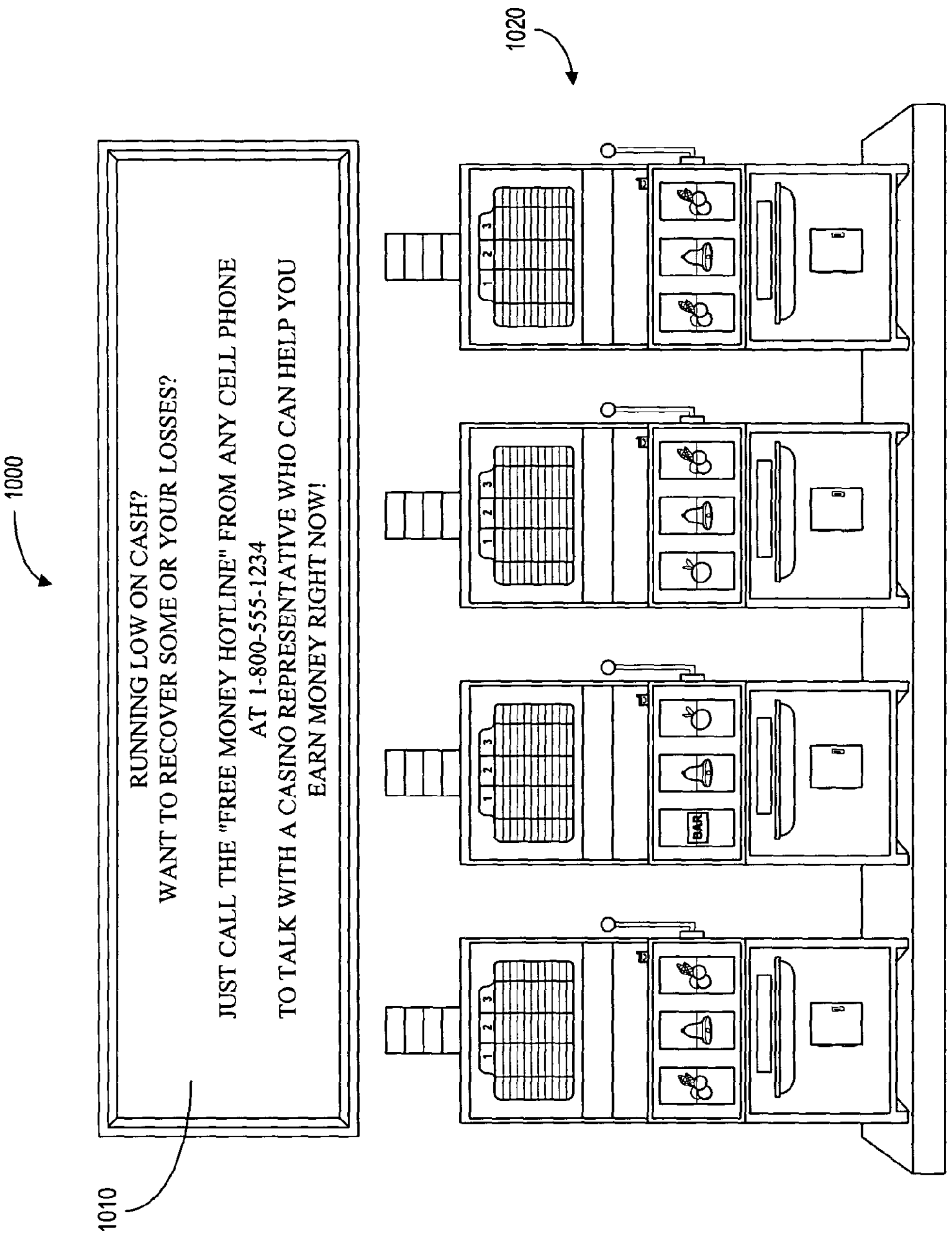
FIG. 10 shows a bank of game machines along with a sign encouraging players to use their cellular telephones to communicate with casino reps.

FIG. 10 shows an embodiment 1000 in which a bank of game machines 1020 along with a sign 1010 encouraging players to use their cellular telephones to communicate with casino reps.

Processes

Various processes in accordance with the present invention are described below, followed by further detail on embodiments thereof.

Figure 11:
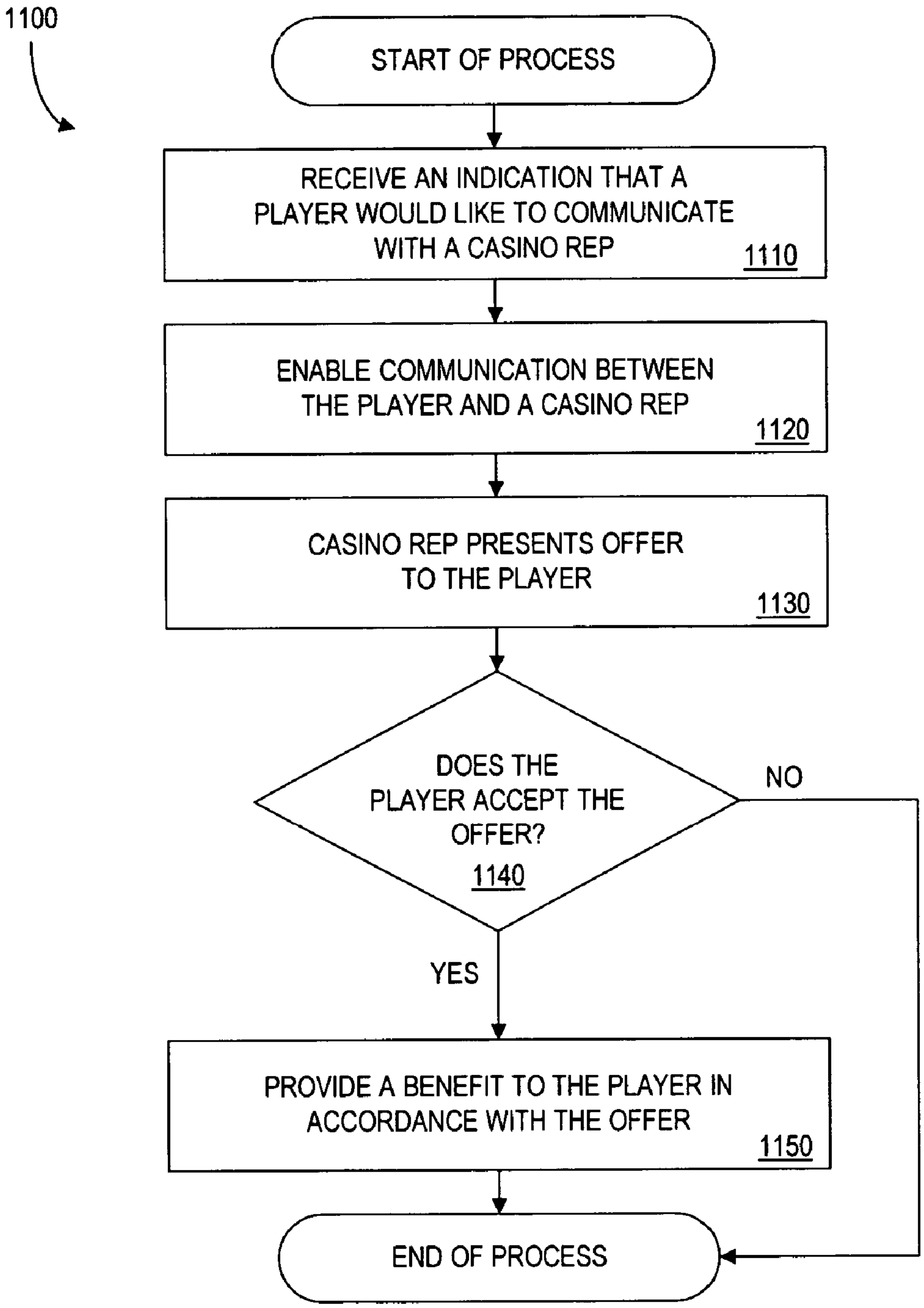
FIG. 11 shows a flowchart corresponding to an embodiment of the invention.

Referring to FIG. 11, a flow chart 1100 represents an embodiment of the present invention. The particular arrangement of elements in the flow chart of FIG. 11, as well as the other flow charts discussed herein, is not meant to imply a fixed order to the steps; embodiments of the present invention can be practiced in any order that is practicable.

At step 1110, an indication that a player would like to communicate with a casino rep is received. Communication between the player and the casino rep is enabled (step 1120). The casino rep presents an offer to the player (step 1130). If it is determined at step 1140 that the player accepts the offer, then a benefit in accordance with the offer is provided to the player (step 1150).

Figure 12:
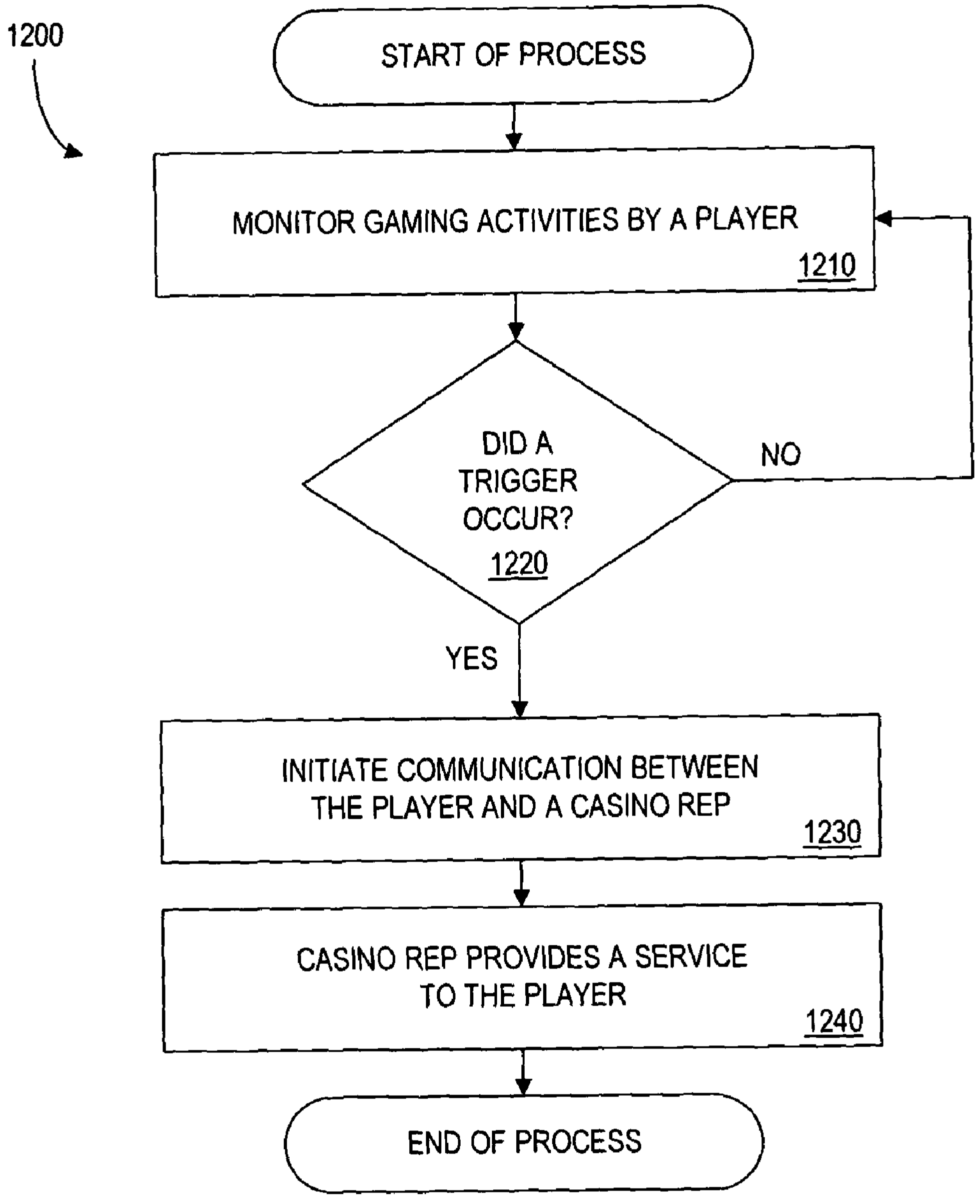
FIG. 12 shows a flowchart corresponding to an embodiment of the invention.

Referring to FIG. 12, the gaming activities of a player are monitored (step 1210). If a "trigger" occurred (step 1220) then communication is initiated between the player and a casino rep (step 1230) and the casino rep may also provide a service to the player (step 1240).

Figure 13:
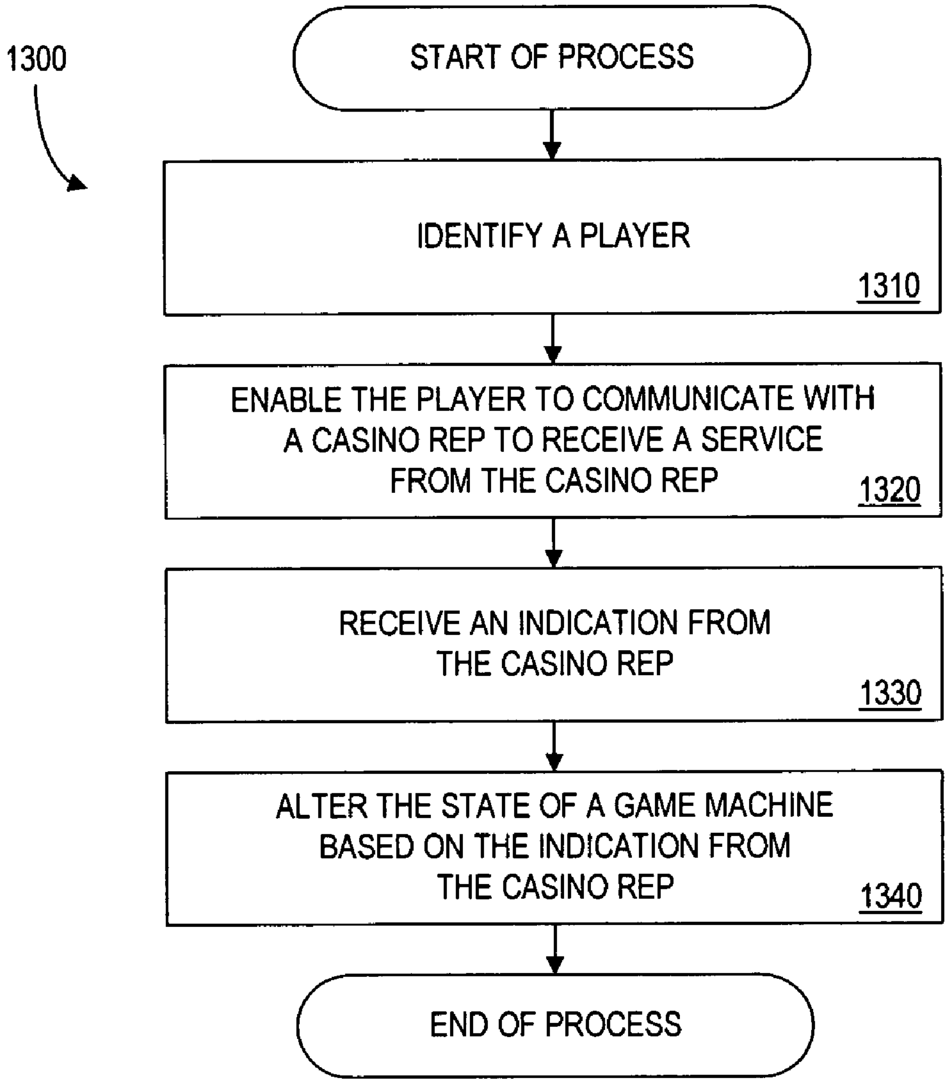
FIG. 13 shows a flowchart corresponding to an embodiment of the invention.

Referring to FIG. 13, a player is identified (step 1310). The player is enabled to communicate with a casino rep (step 1320), to permit the player to receive a service from the casino rep. An indication is received from the casino rep (step 1330) and the state of the game machine is altered (step 1340) based on the indication received from the casino rep.

Figure 14:
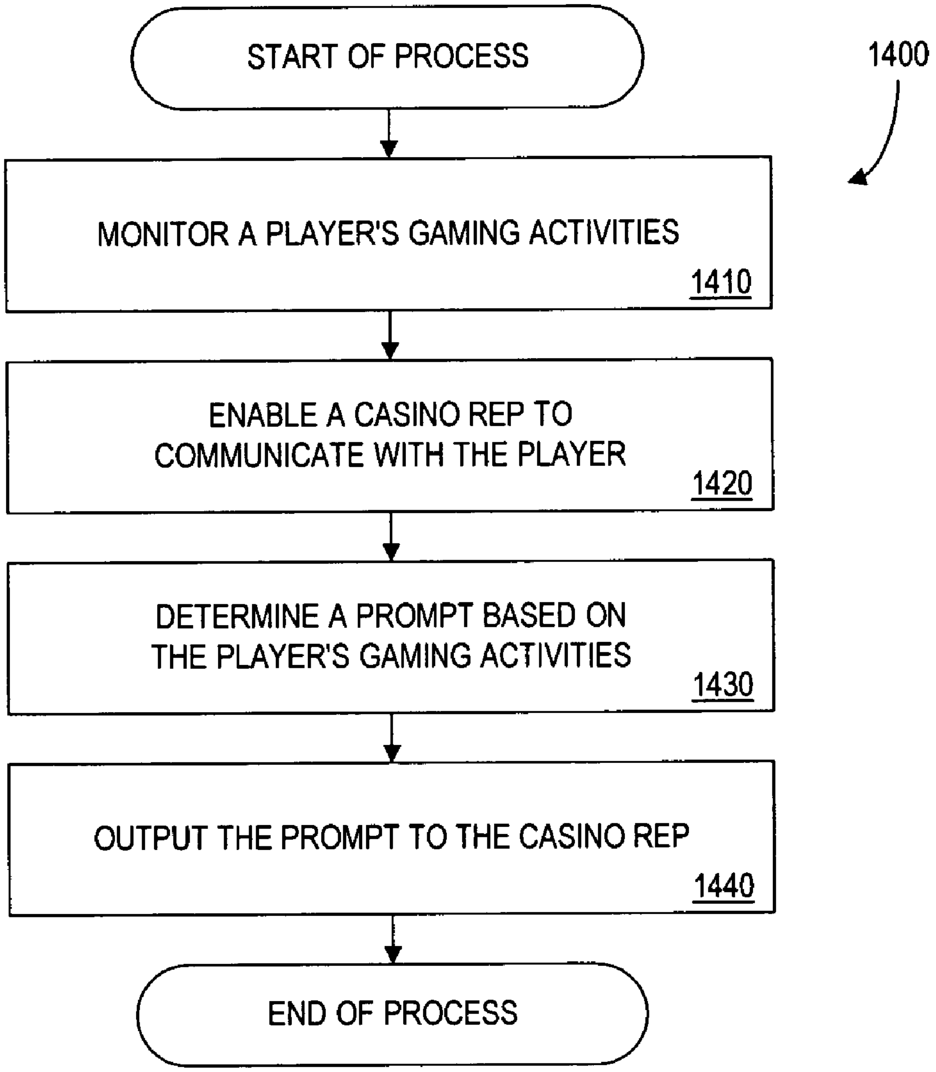
FIG. 14 shows a flowchart corresponding to an embodiment of the invention.

Referring to FIG. 14, the gaming activities of a player are monitored (step 1410). A casino rep is enabled to communicate with the player (step 1420). A prompt is determined based on the gaming activities of the player (step 1430), and the prompt is output to the casino rep (step 1440).

With respect to the disclosed step of identifying a player, a player may be identified in several manners, such as by receiving an indication from a player, or by the controller selecting a player.

According to one embodiment, a player may indicate that he would like to communicate with a casino rep. The player may do this for any of a variety of different reasons. For example, the player may hope to receive an offer from a casino representative, receive a benefit from a casino representative, or receive a service from a casino rep. For example, a player may be confused as to how a game is played and hope to have a casino rep explain it to him. As other examples, the player may hope to communicate with a casino representative, or may receive a benefit for identifying himself.

According to one embodiment, a player may provide an indication using an input device on a game machine. The game device may in turn transmit an indication to the controller. For example, a player may press a button on a slot machine marked "Give me an offer.", a player may use a touch screen on a slot machine to indicate that he would like help in understanding how to play a game, a player may insert an "offer card" (e.g., a ticket, coupon, plastic card, coin, chip, smart card, or other token) into a game machine. For example, when a player arrives at a casino and checks into the casino hotel, he may be given three offer cards by the hostess. To request an offer, all a player has to do is insert one of his offer cards into a game machine that he is operating.

According to one embodiment, a player may provide an indication using a communication device. The communication device may transmit an indication to the controller that identifies the player. For example, a player may pick up a telephone on the side of a game machine, thereby identifying himself and initiating a telephone call to a casino rep. A player may instead press a button on his wireless PDA to identify himself and indicate that he would like to communicate with a casino rep. A player may instead dial a phone number (e.g., a 1-800 number) on his cellular telephone to identify himself and indicate that he would like to communicate with a casino rep.

According to one embodiment, a player may provide an indication by filling out a form. For example, a player may fill out a registration form at a casino's front desk. By providing his name, home address, and cellular telephone number, a player may register himself to receive phone calls from casino reps while he is at the casino.

According to one embodiment, a player may identify himself. For example, a player may provide information about himself including the player's name, the player's identification number (e.g., from a tracking card), a contact identifier for the player (e.g., the player's cell phone number, email address, credit card number, hotel room, or postal address), a slot machine that is being operated by the player (e.g., "I'm the player at slot machine #25"), the player's location (e.g., a player may have a PDA that has a built-in global positioning system), a sufficient number of characteristics of the player to identify him relative to other players in the area (e.g., "I'm a 45-year-old male with gray hair, slightly balding, a mustache, wearing a red and white Hawaiian-print shirt, smoking a cigar, and drinking margarita."), an activity being performed by the player (e.g., "I'm the player operating the ATM machine in the lobby"), a biometric of the player (e.g., a scan of the player's fingerprint, a photograph of the player), a player may wear an identification badge (e.g., a radio frequency identification token, Vividot system by ImageID), a player may indicate to a cocktail waitress or other casino employee that he would like to receive an offer, a player may wave or make a hand signal to a security camera in a casino that is used to monitor the player's gaming activities.

According to one embodiment, a player may indicate a condition or trigger upon the occurrence which he would like to speak with a casino rep. The controller may then identify the occurrence of this condition or trigger and enable the player to speak with a casino rep.

For example, a player may request that he receive an offer for additional funds anytime his credit balance on a game machine falls below 10 coins. Alternatively, a player may request that he receive an offer for increased payouts if he ever loses more than ten spins in a row.

In one embodiment, a player may receive a benefit for providing an indication. Examples of benefits include money (e.g., money or slot machine credits), products (e.g., a souvenir watch, a sweatshirt, a magazine subscription), services (e.g., a free meal, a haircut), discounts on products or services (e.g., 50% off the list price of a hotel room), alternate currencies (e.g., comp points), an entry into a game of chance (e.g., a lottery ticket, a free spin on a slot machine), other consideration.

Money may be provided to a player in a variety of different ways, including as a lump sum payment (e.g., through a check), as a recurring payment (e.g., $100 a month for the next 3 months, $0.05 for each minute that the player converses with a casino rep), by crediting a player's financial account (e.g., bank account, credit card account, casino player account).

According to one embodiment, a benefit may be provided to a party associated with the player (e.g., a friend of the player, a family member, a charity). While providing a benefit a player's favorite charity may not provide a tangible benefit to the player, the player does receive an intangible benefit (e.g., he may feel altruistic and good-hearted). For this reason, benefits to friends of players may be particularly motivational for a player.

Alternatively, or in addition to the above embodiments, the controller may select a player to communicate with a casino rep. For example, the controller may identify a player who is initiating a gaming session and may be confused about how to operate a game machine, or a player who has lost money and may be interested in receiving an offer that would allow him to recoup his loss.

According to one embodiment, the controller may select a player using a rules-based system. One embodiment includes a rules-based system that implements the invention. For example, the controller may store a set of rules as a series of if . . . then statements referencing one or more Boolean expressions (described below). However, it is important to note that many other embodiments are also possible. For example, a player may identify himself as described herein. Alternatively, the controller could select a player using a pseudo-random system in which a random player is selected to communicate with a casino rep. According to one embodiment, a player who communicates with a casino rep may not even be identified until communication is established. For example, the controller could randomly select a slot machine and cause a telephone on that slot machine to ring. Whichever player picks up the phone may then receive an offer from a casino rep. Alternatively, a point system may be used to select a player. For example, the controller could score each player on a variety of different factors (such as those listed below) and then select the player that has the highest score (or a plurality of players with top scores). For example, the controller may allot one point to a player for each coin bet, plus 100 points if a player is staying at the hotel. If Alice is ranked at 321 points and Bob is ranked at 496 points, the controller may select Bob instead of Alice.

According to one embodiment, the controller may consider one or more factors or variables when making its determination of a player. Factors may be related to a player's gaming activities, events relating to a player's visit to a casino (e.g., arrival, hotel stay, meals, entertainment), characteristics of a player, other players associated with the player, opportunities for revenue management of a casino, offers that have been presented or will be presented, indications provided by other parties (e.g., a casino rep, a friend of a player), communication intended, characteristics of casino reps.

According to one embodiment, the controller may identify a player by evaluating a Boolean expression. This Boolean expression may reference one or more variables (i.e., factors) and may include Boolean modifiers and conjunctions (e.g.

AND, OR, XOR, NOT, NAND), comparators (e.g., >, <, =, >=, <=, !=), mathematical operations (e.g. +, –, *, /, mean, standard deviation, logarithm, derivative, integral), and constants (e.g. $10, 20 coins, 300 credits, 0.02, 15%, pi, TRUE, yellow, "raining"). Examples of Boolean expressions include:, (fifty_dollar_bill_inserted) AND (player_tracking_card_inserted), (time_of_day>6 pm) AND (empty_hotel_rooms>30) AND NOT (player_staying_at_hotel), (help_button_pressed=TRUE), (free_money_hotline_phone_on_hook=FALSE)

If a Boolean expression is true then the controller may determine that a communication link should be established between a player and a casino rep.

According to one embodiment, the term "trigger" may be used to refer to any event, condition, Boolean expression, or other factor that causes the controller to identify a player to communicate with a casino rep.

According to one embodiment, the controller may store a trigger database, such as the one shown in FIG. 7. This embodiment of the trigger database tracks when the controller identifies players to communicate with casino reps. Each time the controller identifies a player who should communicate with a casino rep, the controller stores an indication of the time, the reason the player was identified (a.k.a. "the trigger"), and what player was identified. Note that players may be identified for a variety of different reasons, including because a player himself provided an indication.

According to one embodiment, the controller may select a player to communicate with a casino rep based on the player's gaming activities. For example, a player may be identified if he has played a certain number of games, or if he has maintained a certain rate of play. Examples of information about a player's gaming activities include an amount of play, a rate of play, a credit balance, comp points earned, events at a game machine that is operated by a player, statistics relating to usage of a game machine by a player.

According to one embodiment, the controller may identify a player based on factors relating to an amount of play by the player. Examples include a duration of play (e.g., how many minutes a player has operated a game machine), how many games a player has played, how many comp points a player has earned, how long a player uses a feature on the game machine (e.g., how long a player operates a game machine in 3D Graphics Mode), how long a condition has been true (e.g., How long has the player maintained a rate of play of more than 3 games per minute? For how many games has the player's credit balance been above 40 coins?).

An amount of play may be measured in a variety of different units, including time (e.g., seconds, minutes, hours), occurrences (e.g., number of spins, number of hands), currency (e.g., number of coins, dollar value, comp points).

According to one embodiment, the controller may identify a player based on factors relating to the player's rate of play. Examples include amount of currency per minute (e.g., coins per minute, dollars per minute), average amount of currency per minute (e.g., on a game machine that he is currently operating, on all game machines that he has played since acquiring a player device), average amount of currency per spin, average number of games per minute, is a player currently operating a game machine? (i.e., is his rate of play greater than zero?).

According to one embodiment, a rate of play may be measured as an amount of play per unit. For example, the controller may track an average amount of currency bet per spin (e.g., 2.3 coins/spin) or an average amount of currency bet per minute (e.g., 6.7 coins/minute). Examples of units for a rate of play include per session, per game play (e.g., a spin on a slot machine, a hand of video poker), per minute (or other unit of time—seconds, hours, days, etc.), per event (e.g., per spin, per usage of a feature, per card selection in video poker, per coin bet).

According to one embodiment, the controller may identify a player based on factors relating to the player's credit balance. Examples include current credit balance on a game machine, average credit balance (e.g., on a game machine that he is currently operating, on all game machines that he has played since acquiring a player device).

According to one embodiment, the controller may identify a player based on a number of comp points earned by the player. Comp points may be provided to a player for a variety of different reasons, as are known to those skilled in the art.

According to one embodiment, the controller may identify a player based on events at one or more game machines that are operated by a player. Examples of events at a game machine include outcomes that are generated by the game machine, intra-game events (e.g., a player is dealt a card in video poker, a player discards a card in video poker, a player gains access to a bonus round on a slot machine), payouts that are provided by the game machine (e.g., 10 coin payout, a $100 jackpot), money is inserted into the game machine by a player (e.g., using a bill acceptor or a coin slot), money is removed from the game machine by a player (e.g., a player presses the 'cash out' button), a bonus is provided to a player (e.g., a player may earn a 10 coin bonus for inserting a $20 bill into a game machine), a player identifies himself (e.g., a player may insert a player tracking card into the game machine), a feature is activated or deactivated. According to one embodiment, a player may receive a service as long as a feature is enabled, a player operates an input device on the game machine (e.g., a player presses the 'spin' button on a slot machine, a player uses a touch screen to select a card on a video poker machine), information may be output to a player using an output device (e.g., an message may be displayed to a player on a video screen alerting him that he only has 10 coins left), indications from sensors (e.g., a game machine may have a weight sensor that determines when a player is standing in front of the game machine).

In addition to events themselves, the controller may track information about events, including what event occurred, when the event occurred (e.g., what date, what time of day, ordering of events), how often an event occurred (e.g., 14 times, an average of 32.6 times per hour), how much money was added/removed/involved in the event (e.g., How much money did a player insert into a game machine? How large was a payout provided to a player?), results of the event (e.g., What was a player's credit balance after he won a jackpot? What is the state of a program on a game machine after the game machine's software is upgraded?), what caused an event to occur (e.g., why did a player win a jackpot of 100 coins?), other information describing the event (e.g., what authentication code was provided, what activation code was provided).

Alternatively, or in addition, the controller may identify a player based on statistics relating to usage of one or more game machines by a player. Examples of statistics include totals, averages, percentages and ratios, revenues ("win"), theoretical win, total prizes won, play patterns (events, times, order, speed of play, strategies used by players).

Examples of totals include a total amount of time (e.g., how many hours a game machine is operated, how many minutes a feature is used), a total number of occurrences of an event (e.g., a total number of offers accepted by players, a total number of times that a feature is activated), a total value of a plurality of events (e.g., a total amount of money cashed out of a game machine, a total amount of payouts provided).

Examples of averages include average credit balance, average coin-in per spin, an average number of occurrences of an event (e.g., an average number of spins per minute), an average value of a plurality of events (e.g., an average credit balance, an average price of hotel rooms sold to players through a game machine)

Averages may be calculated on a ‘per unit’ basis. For example, the controller may calculate an average coin-in per game (e.g., 2.3 coins per game) or an average coin-in per session (e.g., 165.2 coins per session). Examples of units for averages include, per session, per game play (e.g., a spin on a slot machine, a hand of video poker), per minute (or other unit of time—seconds, hours, days, etc.), per event (e.g., per usage of a feature, per card selection in video poker).

Examples percentages and ratios include a percentage of time (e.g., what percentage of time a game machine spends waiting for a input from a player), a percentage of events (e.g., what percentage of offers presented to a player are accepted), a percentage of games (e.g., what percentage of games are played with a particular feature enabled), a percentage of sessions (e.g., what percentage of sessions are longer than 3 hours).

The controller may identify a player based on events relating to a player's visit to a casino (e.g., arrival, hotel stay, meals, entertainment), characteristics of a player, other players associated with the player, opportunities for revenue management of a casino, offers that have been presented or will be presented, indications provided by other parties (e.g., a casino rep, a friend of a player), communication intended, characteristics of casino reps.

According to one embodiment, the controller may identify a player based on events or conditions relating to a player's visit to a casino. Examples include when a player arrived at the casino, whether the player has reserved a hotel room at the casino, visits by a player to his hotel room, whether the player has purchased a meal at restaurant associated with the casino, meals eaten by the player at restaurant associated with the casino, the current time of day is 6 PM, which is when the player usually eats dinner, the current time of day is 8 AM, and the player must check out of the hotel at 11 AM, the player receives a complimentary beverage, the player requests a complimentary product or service, the player receives a complimentary product or service, the player attends a show or sporting event, previous visits to the casino by the player.

According to one embodiment, the controller may identify a player based on characteristics of the player. Examples of characteristics of players include a player's preferences (e.g. hobbies, interests), a player's demographic group, what language a player speaks, a player's offer history—offers that have been made to this player in the past (e.g., by this casino rep or other casino reps).

According to one embodiment, the controller may select a first player based on events or conditions relating to other players who are in some way associated with the first player.

Examples of other players associated with the player include a player who operating a nearby slot machine, a player who is sharing a room with the player, a player who arrived on the same bus as the player, family members, friends, and other associates of the player.

Conditions or events relating to revenue management of a casino may also be considered in selecting a player to communicate with a casino rep. For example, to maximize revenues, a casino may want to fill all of its hotel rooms on a Saturday night. If it is 6 PM on Saturday night and the casino hotel is only half full, then this may result in a trigger (e.g. offering a free or discounted room to the player if he agrees to perform some obligation).

As another example, to maximize revenue, a casino may desire to maximize the number of slot machines that are being played at any given time. A trigger may occur if only 10% of the slot machines in a casino are currently being played (e.g. play slots and get a pair of show tickets for the price of one).

In one embodiment, the controller may track offers that are presented to players (e.g., using an offer tracking database, not shown). Accordingly, the controller may select a player based on events or conditions relating to one or more offers that may have been presented to the player. Examples include the player completes an activity specified by a previous offer, the player does not perform an activity specified by a previous offer, the inventory of offers reaches a certain level (e.g., in an embodiment where only a limited number of offers may be presented), an activity or benefit is added to the offer database, the player accepts or rejects an offer, one or more subsidies that may be provided to a casino based on an offer. For example, credit card issuer may provide a subsidy to a casino if the casino rep offers a player a new credit card.

According to one embodiment, the controller may select a player based on one or more subsidies that are available from subsidizers.

Indications by other parties may also act as triggers for a player to communicate with a casino rep. For example, a casino rep may indicate that an offer should be presented to a player. A casino rep may indicate that a player seems confused and may need assistance in learning how to play a game. A casino rep may indicate that a player seems upset and may want to speak with a casino rep. A family member, friend, or other associate of a player may indicate that he would like the player to speak with a casino rep. For example, a friend of a player may indicate that the player just lost $50 at another casino and would be interested in earning the money back. A party may specify a condition or trigger upon which a player should speak with a casino rep. For example, a casino rep may request that a player receive instructions any time she starts playing a game that she has never played before.

A casino rep who is on the casino floor may use a PDA (personal digital assistant) or other electronic device to identify a player. For example, a hostess at a casino may use a wireless handheld device to identify a player who might be interested in receiving an offer. A casino rep may view players on a casino floor using one or more security cameras, microphones, or other surveillance devices. The casino rep may identify a player to speak with a casino rep based on his observations of the player. A casino rep review information about a player that is stored in a database (e.g., the player database shown in FIG. 5). Based on this information, the casino rep may determine that the player should communicate with a casino rep.

A party may need to provide information about a player in order to identify the player (e.g., by indicating the player's name, location, cell phone number, physical appearance)

According to one embodiment, the controller may select a player based on what communication may take place between the player and a casino rep. Examples of factors relating to communication that may take place between a player and a casino rep include the content of the communication, what communication device a player would use, what communication device a casino rep would use, when the communication would occur, the potential duration of the communication, activities of casino reps (e.g., which casino rep is currently unoccupied?), skills of casino reps (e.g., selling skills, language skills, knowledge of products described in the offer), responsibilities of casino reps (e.g., waiting to greet players at the door, keeping the slot machines clean, serving drinks), commissions paid to casino reps (e.g., which casino rep deserves an opportunity to earn additional commissions?), locations of casino reps (e.g., which casino rep is closest to the player?), preferences of casino reps (e.g., certain casino reps may prefer to make certain types of offers), other measures of compatibility a player (e.g., age, hobbies, interests, etc.).

For example, a casino rep may present an offer to a player, a casino rep may assist a player in learning how to play a game. As another example, a first player may be operating a game machine that has a built-in video phone, whereas a second player may have a cellular telephone. If the acceptance rate for offers presented by video phone is greater than the acceptance rate for offers presented by cellular telephone, then the controller may select the first player instead of the second player. As another example, a focus group (i.e., a type of communication) may be scheduled for 5 PM. If this time would be inconvenient for a player, then this player may not be selected for the focus group.

As another example, if a long duration conversation is intended between a player and a casino rep, then the controller may refrain from selecting a player who is currently very busy or a player who has tickets to a show in 5 minutes.

As another example, the controller may select a player based on one or more casino reps who may be available to communicate with the player. Examples of characteristics of casino reps that may be considered in selecting a player include if a casino rep who only speaks Spanish is available, then the controller may be careful to select a player who also speaks Spanish.

Note that the controller may receive information about triggers from a variety of sources, including the player himself, game machines (e.g., a game machine may transmit a message to the controller when a player inserts his tracking card), communication devices (e.g., a video phone on a game machine, a cellular telephone carried by a player), input devices (e.g., a button on a game machine, a microphone on a communication device, a check-in terminal in the hotel lobby), other parties (e.g., a casino employee, a friend of a player), databases accessible by the controller. For example, the controller may store information about a player in a player database, such as the one shown in FIG. 5. The controller may select one or more players to communicate with casino reps based on information stored in the player database or other databases.

According to one embodiment, the controller may identify a casino rep to communicate with a player. Note that this step may be performed before or after the controller identifies a player. For example, the controller could identify a casino rep and then identify a player, or the controller could identify a player and then identify a casino rep.

According to one embodiment, the controller may select a casino rep using a rules-based system. One embodiment of a rules-based system that implements the invention is described below. For example, the controller may store a set of rules as a series of if . . . then statements referencing one or more Boolean expressions. However, it is important to note that many other embodiments are also possible, including a pseudo-random system (e.g., the controller may randomly select a casino rep from a list of casino reps who are available to communicate with players), allowing the player to choose a casino representative (e.g., a player may view a list of casino reps who are available and select which casino rep he would like to communicate with from this list), a point system may be used to select a casino rep. For example, the controller could score each casino rep on a variety of different factors (such as those listed below) and then select the casino rep that has the highest score (or a plurality of casino reps with high scores).

According to one embodiment, the controller may consider one or more factors or variables when selecting a casino rep. Any of the factors described herein for identifying a player may also be used to determine a casino rep. Examples include what trigger occurs (e.g., if a player is selected because he won a jackpot, then he may communicate with a first casino rep, whereas a player who is selected because he requested help may communicate with a second casino representative), characteristics of casino reps since different casino reps may have different characteristics (e.g., training, knowledge, specialties), characteristics of a player (e.g., if a player only speaks French, then the casino rep may select a casino rep who also speaks French), communication intended (e.g., if it is intended that a casino rep present an offer to a player, then a first casino rep may be selected, whereas a second casino rep may be selected if it is intended that the casino rep explain to a player how to play a game), past communication (e.g., a casino rep may have communicated with a player in the past and developed a rapport with the player), other players associated with the player (e.g., if a casino rep has already spoken with a friend of a player), indications provided by various parties (e.g., a player, a casino rep, a friend of a player), factors relating to offers (e.g., different casino reps may be employed by different subsidizers, subsidies.

According to one embodiment, the controller may store information about characteristics of players in a player database, such as the one shown in FIG. 5. In such an embodiment of the player database, the "Notes" field stores information about characteristics of players that may be useful in determining which casino reps the player should communicate with.

According to one embodiment, the controller may determine a casino rep using a casino rep database, such as the one shown in FIG. 6. Such an embodiment of the casino rep database stores information about a each casino rep's training and/or specialties, which may be useful in selecting a casino rep for a particular type of communication with a player. For example, the controller may select casino rep "C-REP-4-14379051" (Diana) to communicate with a player who speaks Spanish.

According to one embodiment, a casino rep may work out of a call center. For example, the controller may act as a switch that controls which players communicate with which casino reps.

According to one embodiment, casino reps may work in a plurality of call centers, some of which may not be proximate to or associated with the casino. For example, a first casino rep may work in Ford Motor Company's call center, located in Detroit, Mich., and a second casino rep may work in Charles Schwab's call center, located in San Francisco, Calif. Either of these casino reps may be identified to speak with a player operating a game machine in Las Vegas, Nev.

According to one embodiment, various parties may employ a casino rep to communicate with players. Examples of employers of casino reps include the casino, product manufacturers, service providers, advertising agencies, retailers.

According to one embodiment, the controller may enable communication between a communication device operated by a player and a communication device operated by a casino rep. For example, the controller may act as a switch. Communication between a player and a casino rep may pass through the controller. One example of this embodiment is shown in FIG. 1A. For example, the controller may use a first communication network to communicate with a player's communication device, and the controller may use a second communication network to communicate with a casino rep's communication device. According to one embodiment, the controller may act as a switch in a telephone network.

As another example, the controller may tell a casino rep or a casino rep's communication device which player or player's communication device to connect to. For example, after identifying a player and identifying a casino rep, the controller may transmit an indication of the player to the casino rep's communication device. The casino rep's communication device may then connect to the player's communication device using a communication network (e.g., a telephone network).

As another example, the controller may tell a player or a player's communication device which casino rep or casino rep's communication device to connect to. For example, after identifying a player and identifying a casino rep, the controller may transmit an indication of the casino rep to the player's communication device. The player's communication device may then connect to the casino rep's communication device using a communication network (e.g., a telephone network).

As another example, the controller may transmit message to both a player's communication device and a casino rep's communication device, indicating that they should connect to each other.

In one embodiment, the availability of a casino rep (or of any casino rep) may be indicated to the player at various times. It can be important for a player to be notified when a casino rep (or any casino rep) has become available. For example, when a player has attempted to communicate with a casino rep, but no appropriate rep was available at that time, that player may desire to be notified when a rep (or any casino rep) becomes available. If more than one such player has indicated such a desire, the players' requests may be assigned to a queue.

Players in the queue can then all be notified when a casino rep becomes available. Alternatively, the first player (or first predetermined number of players) in the queue can be notified. Alternatively, all players may be notified when a casino rep becomes available.

The indication to the player that a casino rep is available may include, e.g., an audio or visual indication, such as a flashing light, text or images on the gaming device, a prerecorded message. Alternatively, the casino rep may initiate communication (e.g., with the first player in the queue).

According to one embodiment, a player or a casino rep may need to wait for communication to be established. For example, a casino rep may wait for a player's communication device to be activated. For example, the controller may initiate an outbound phone call from a call center. A casino rep may then wait for a player to answer his phone before communicating with the player.

As another example, a player may wait for a casino rep's communication device to be activated. For example, a player may initiate an inbound phone call to a call center. The player may then wait for a casino rep to answer the phone call before communicating with the casino rep.

According to one embodiment, the controller, a communication device, or another device may indicate to a player or a casino rep that communication is pending. For example, a telephone on a game machine may ring, indicating to a player that a casino rep would like to speak with the player.

As another example, a message may be displayed to a player using a video screen on a game machine, "A casino rep would like to speak with you."

As another example, a message may be displayed to a player using a video screen on a game machine, "Want to receive 50 additional credits? Press here to communicate with a casino rep."

As another example, a message may be displayed on a computer terminal operated by a casino rep, "Player PLAYER-4-02834555 would like to receive a tour of slot machine #175".

As another example, a phone console operated by a casino rep may ring, indicating that a player would like to communicate with the casino rep.

According to one embodiment, communication between a player and a casino rep may be initiated in response to a player or a casino rep activating a communication device. For example, a player may pick up a telephone handset located on the side of a game machine, thereby initiating communication with a casino rep.

As another example, a player may press a button on game machine to indicate that he would like to use the game machine's built-in video phone to communicate with a casino rep. The video phone may subsequently be activated and the video screen on the game machine may display a picture of the casino rep.

As another example, a casino rep may operate a computer terminal to select a player that he would like to communicate with and then initiate a phone call with this player.

As another example, a casino rep may operate a computer terminal in a call center that is equipped with voice recognition software. To answer an incoming phone call, the casino rep may speak the words, "Answer phone" into a microphone.

Alternatively, a player or casino rep may not have to activate a communication device in order to initiate communication. For example, a video phone on a game machine may automatically be activated whenever a player has been gambling for at least an hour and his credit balance falls below 10 coins. Upon activation the video phone may immediately enable communication between a player and a casino rep.

According to one embodiment, one or more functions on a game machine may be paused, disabled, or locked while a player is communicating with a casino rep. For example, one or more controls on a game machine may automatically be disabled whenever a player activates a communication device associated with the game machine. Since a player may be prevented from operating the game machine while it is paused, the player may devote his full attention to paying attention to communicating with a casino rep. This may result in the casino rep having increased success in communicating with the player (e.g., better offer acceptance rates, better retention of education provided by a casino rep). In some circumstances, the benefits of a casino rep getting a player's full attention may outweigh any inconvenience to a player of pausing his game machine.

For example, a game machine may be paused as soon as a player picks up a telephone on the side of the game machine, a player may prevented from placing bets while a casino rep is presenting an offer to the player, a player may be prevented from changing options on a game machine while a casino rep is giving the player a tour of the game machine.

Alternatively, a player may continue to operate a game machine while he communicates with a casino rep. A variety of different types of communication devices are possible, including telephones, video phones, and computer terminals. Similarly, a variety of different types of communication are possible, including audio, video, text, images, selections/responses). Also, communication between a player and a casino rep may be uni-directional communication or bi-directional communication.

Three or more parties may use communication devices to communicate with each other simultaneously (e.g., a player may communicate with two casino reps, a casino rep may communicate with two players). Also, a player or casino rep may simultaneously operate a plurality of communication devices.

Communication may include providing information and/or receiving information.

Note that communication devices may communicate using a communication network.

According to various embodiments, communication between a player and a casino rep may include a player may receive a service from a casino representative, a casino rep may market a product or service to a player, a player may provide a service to a casino representative.

According to one embodiment, a player may receive a service from a casino rep. Examples of services that may be provided by a casino rep include education (e.g., a casino rep may teach a player how to operate a game machine), complimentaries ("comps") (e.g., order free drinks or food while operating a game machine), pleasantries (e.g., a casino rep may welcome a player to a casino and wish him good luck).

According to one embodiment, a casino rep may educate, demonstrate, guide, or teach a player about a game machine. For example, a casino rep may guide a player through the process of operating a game machine. A player may use a telephone on a game machine to communicate with a casino rep who is operating a computer terminal and a hands-free phone. The casino rep may be able to view information about how the player operates the game machine (e.g., what buttons are pressed) and then provide suggestions to the player as to how to operate the game machine (e.g., "Great! Now that you've set your bet size, you can select which reels you want to spin by pressing the flashing buttons.").

As another example, a casino rep may give a player a "tour" of the machine. For example, a game machine may have a bonus round that is different from regular play on the game machine. In order to show a player how this bonus round is played, how much fun the bonus round is, and how much money the player can win during the bonus round, a casino rep may give the player a tour of bonus round. This tour may provide the player with free entry into the bonus round, and the casino rep may explain various features of the bonus round to the player as part of the tour.

As another example, a player may ask a casino rep questions about how to operate a game machine (e.g., for a Jacks Or Better video poker game, "When I have a pair of kings and 4 cards of a flush, should I draw to the pair or to the flush?"). The casino rep may then advise the player based on the question the player asked (e.g., "Keep the pair of kings—even if you don't draw a better hand, you'll still at least win your money back for the round."), In the process of educating a player, a casino rep may remotely operate a game machine. For example, a casino rep may show a player how to operate a video poker machine, "Okay, so at the start of the game, you're dealt 5 cards." The casino rep may then use a computer terminal to remotely operate the game machine and cause 5 cards to be dealt to the player. "In this case, you got a pair of kings and three low value cards. So I'm going to select the three low value cards by touching them . . . " The casino rep may then remotely operate the game machine to select the three cards, thereby demonstrating to the player how to do this. " . . . and press this button to register your changes." At this point, the casino rep may again demonstrate to the player how to operate the game machine. Finally, the casino rep may explain the result of the game to the player, "So it turns out that you got lucky and drew another king, giving you a total of 3 kings, which means that you win a payout of 15 coins."

As another example, a casino rep may monitor a player's play at a game machine and provide suggestions. For example, a player may receive assistance from a casino rep in playing a bonus round on a game machine. As the player makes choices during the bonus round, indications of these choices may be transmitted to the casino rep and displayed to him using a computer terminal. The casino rep may then comment on these choices and provide feedback to the player using a communication device.

According to one embodiment, a casino rep may provide a service of "pleasantries" to a player. Examples of pleasantries include greetings, thankyou's, sympathy, encouragement, and advice. For example, a casino rep may use a communication device to welcome a player to a casino, wish him good luck, or console him after a loss. According to one embodiment, a casino rep may be a specialist in comforting players (e.g., an astrologer or psychic).

According to one embodiment, a casino rep may market a product or service to a player. For example, a casino rep may advertise a product or service to a player. For example, a casino rep may attempt to get a player to sign up for a new credit card or purchase a new cellular phone at an electronics store associated with the casino.

As another example, a casino rep may present an offer to a player. For example, a casino rep may offer a player a free night's stay at a hotel associated with the casino if the player agrees to maintain a rate of play of at least 5 coins per minute for the next hour. A wide variety of different types of offers are possible.

According to one embodiment, a player may provide a service to a casino rep. For example, a player may provide information to a casino rep. For example, a player may provide information about himself (e.g., hobbies, home telephone number, purchasing history, intended purchases) to a casino rep. This information may later be used to market products or services to the player.

As another example, a player may participate in a focus group. For example, a casino rep may lead a focus group comprised of players who communicate using telephones on game machines.

According to one embodiment, the controller may determine a subject of communication between a casino rep and a player. For example, the controller may determine that a casino rep should present an offer to a player or provide education to a player. In addition, the controller may determine what offer to present or what type of education to provide. An indication of the subject of communication (e.g., determined by the controller) may then be output to the player as described herein.

The controller may determine a subject of communication based on a variety of factors, including events relating to a player's visit to a casino (e.g., arrival, hotel stay, meals, entertainment), characteristics of a player, other players associated with the player, opportunities for revenue management of a casino, offers that have been presented or will be presented, indications provided by other parties (e.g., a casino rep, a friend of a player), indications by the player (e.g., "I want to talk about shopping for clothes"), communication intended, characteristics of casino reps.

According to one embodiment, information relating to communication between a casino rep and a player may be output to the casino rep. Examples of such information include: information about the player, and a prompt describing what the casino rep should communicate. Each of these types of information is described in additional detail below.

According to one embodiment, information about a player may be output to a casino rep (e.g., using a computer terminal or communication device). Examples of information about a player include information that identifies the player (e.g., the player's name, the player's identification number, a photograph of the player), information relating to the player's visit to a casino (e.g., when the player arrived at the casino what hotel room the player is staying in, what other activities a player has enjoyed, what show tickets a player has purchased, when a player is planning on leaving the casino), information about a player's interests or hobbies, demographic information about a player, information about a player's gaming activities (e.g., what games the player has played, how much money a player has won/lost, how long a player has spent gambling), characteristics of a player (e.g., a player's hobbies or interests), other players associated with the player (e.g., a player's friends or family), other player related information (factors) described herein.

Information about a player may be helpful to a casino rep when communicating with a player. For example, a casino rep who assists a player in learning how to play a game machine may find it helpful to know what other game machines the player has played before. Also, a casino rep who presents an offer to a player may find it helpful to know what a player's hobbies and interests are, so that he can understand why the player might want to accept the offer (e.g., what benefits may be most enticing to the player).

As another example, a casino rep who offers a player a free night's stay at casino hotel may find it helpful to know whether the player has stayed at the casino hotel before and what family members the player has who are also visiting the casino right now.

According to one embodiment, a prompt may be output to a casino rep. This prompt may describe what the casino rep should communicate to the player. For example, a prompt may describe a subject of communication, or a prompt may describe an offer that a casino rep should present to a player (e.g., "Offer the player 50 credits if he agrees to test drive a Ford sometime in the next two months").

In a second example of a prompt describing an offer, a casino rep may be prompted to recite, "Good afternoon, Mr. Rogers, and welcome to the Lucky Dice Casino. I hope your day is going well, and I'd like to make you a special offer. I've been authorized to give you a free meal ticket for two to eat at the Coffee Shop, located here in the casino. They're having a special today on prime rib, and beers are always just $1. All you have to do to qualify for this offer is to sign up for a new credit card from Blue Bank. If you're interested, I can process your credit card application right now. Would you like to accept this offer for a new credit card and a free meal a the Coffee Shop?"

A prompt may be a script that a casino rep should recite to a player. For example, a casino rep may be prompted, "Hi, my name is Andy and I'm going to give you a quick tour of the Rascally Rabbit slot machine. The first thing you want to do is decide how many coins you want to bet- 1, 2, or 3 coins. To change the number of coins that you bet, press the 'increase bet' and 'decrease bet' buttons on the left side of the video screen, next to handle." A prompt may describe a topic of conversation (e.g., "Assist the player in learning how to play the game machine", or "Convince the player to continue gambling for another 10 minutes"), A prompt may be expressed in shorthand of some sort. For example, a casino rep prompted with the phrase, "Activity: credit card, Benefit: Meal". Through his training the casino rep may know that this prompt means that he should offer the player a free meal ticket for two to eat at the Coffee Shop if the player signs up for a new credit card from Blue Bank.

According to one embodiment, information (e.g., a prompt, information about a player) may be output to a casino rep using a computer terminal or a communication device. For example, the controller may determine information (e.g., a prompt, information about a player) and then transmit it to a computer terminal or communication device operated by a casino rep. The computer terminal or communication device may then display the information to the player. Note that a casino rep may operate a plurality of devices; for example, a casino rep may operate both a computer terminal and a hands-free telephone.

Information (e.g., a prompt, information about a player) may be displayed to a casino rep at various times, including before the casino rep communicates with the player, while the casino rep is communicating with the player, after the casino rep communicates with the player.

Information (e.g., a prompt, information about a player) may be output to a casino rep in various forms, including text (e.g., a video screen on a computer terminal may display a text message to casino representative), audio (e.g., a casino rep who is speaking on a telephone with a player may hear a second voice, not heard by the player, that coaches him on what to say to the player), video (e.g., a video screen on a computer terminal may display an icon indicating what type of offer a casino rep should make to a player.

According to one embodiment, a casino rep may use a computer terminal to control a game machine. For example, a casino rep may provide an indication using an input device (e.g., a keyboard) on a computer terminal. This indication may be transmitted to a game machine using at least one communication network. The game machine may then respond to the indication in an appropriate manner.

A casino rep may use a computer terminal to control various functions of a game machine, including adjusting a bet size (e.g., 1 coin, 2 coins, or 3 coins), placing a bet (e.g., funded by a credit balance stored in the game machine), requesting change (e.g., activating a 'change request' light on top of the game machine), cashing out (e.g., causing a game machine to dispense one or more coins), identifying a player (e.g., providing a player identifier to the game machine), providing an input relating to game play (e.g., selecting a card in video poker), enabling a feature (e.g., enabling Auto-Play mode), disabling a feature (e.g., disabling Jackpot-Only mode), navigating a menu system, controlling an input device (e.g., a casino rep may use a computer terminal to move a cursor), controlling an output device (e.g., a neon sign that a casino rep can turn on and off using a computer terminal), dispensing a product (e.g., a game machine may include at least one product dispenser, which may be activated by a casino representative), increasing a credit balance (e.g., a casino rep may provide credits to a player as a bonus or for accepting an offer), decreasing a credit balance (e.g., a player may use a credit balance on a game machine to purchase one or more products or services from a casino representative), pausing, disabling, or locking a game machine (e.g., a casino rep may disable the controls of a game machine while he is communicating with a player), linking machines (e.g., a casino rep may assist one or more player by linking the game machines of a plurality of players together for group play).

Note that not all implementations will have all of these capabilities. For example, a casino may be concerned with the security risks associated with increasing the credit balance on a game machine using a remote computer terminal. Accordingly, various features (e.g., allowing a casino rep to adjust a credit balance) may be disabled in some embodiments of the invention.

According to one embodiment, a game machine may require a casino rep to provide a password, authentication code, or other secret code in order to be able to control a game machine using a computer terminal. Requiring a casino rep to provide a password may help to prevent computer hackers or untrustworthy players from controlling a game machine surreptitiously.

According to one embodiment, a casino rep may communicate with a player at substantially the same time that he controls a game machine. For example, a casino rep may control a game machine while he communicates with a player. For example, a casino rep may demonstrate how to use a game machine by controlling a game machine using a computer terminal while simultaneously using a communication device to explain how to use the game machine.

As another example, a casino rep may communicate with a player and then control a game machine. For example, a casino rep may provide a benefit to a player based on the player accepting an offer.

As another example, a casino rep may control a game machine and then communicate with a player. For example, a casino rep may activate 3D Graphics Mode on a game machine and then communicate with a player to point out the benefits of 3D Graphics Mode.

According to one embodiment, a player may control a game machine by communicating with a casino rep. For example, a game machine may be set up so that certain functions (e.g., activating a feature) may only be performed by casino rep operating a computer terminal. In order to control the game machine, a player may use a communication device to describe an action to a casino rep (e.g., "I'd like to use Jackpot-Only Mode.") Based on the player's description, the casino rep may then use a computer terminal to control the game machine (e.g., activate Jackpot-Only Mode on the game Machine). One might even consider the casino rep to be a part of the "operating system" for the game machine.

Note that there are various advantages to having a casino rep control a game machine instead of having a player control the game machine himself. Advantages include convenience to a player. If a game machine has lots of controls, a large number of options, or a complicated user interface, a player may become confused about how to operate a game machine. While the player may know what action he would like perform, he may not be able to figure out how to control the game machine to perform this action. In scenarios like this one, the player may find it more convenient to communicate with a casino rep and have the casino rep control the game machine. There are also fewer player complaints. If players are confused by how to operate a game machine, they may make mistakes, causing a game machine to perform undesired functions. These players may then complain to a casino's customer service department, costing the casino money.

Further, there are marketing opportunities. Each time a player uses a communication device to communicate with a casino rep, the casino rep may have an opportunity to market a product or service to the player. For example, as part of the processing of assisting a player in operating a game machine, the casino rep may advertise a feature on the game machine to the player or present an offer to the player. Players may be particularly receptive to offers presented by casino reps who are helping them to operate a game machine, resulting in increased revenues for a casino or other party operating the controller.

Alternatively, or in addition, the controller may be able to control a game machine remotely.

An offer as described herein generally includes two components: an activity that should be performed by the player (or obligation to be completed), and a benefit to be provided to the player contingent on the performance of the activity.

As used herein, the term "offer" is used for convenience, since activities and benefits are often presented to a player simultaneously by a casino rep.

In order to earn a benefit, a player may perform an activity. Examples of activities include signing up for a new credit card, and answering survey questions about a product or service.

In many cases, an activity has value to a subsidizer. For example, a credit card issuer may be willing to pay up to $50 to get a customer to sign up for a new credit card, since acquiring this customer will likely result in more than $50 of profits for the credit card issuer. A casino or other party may receive a subsidy from a subsidizer based on an offer.

Basic types of activities include purchasing a product or service, using a product or service, selling a product or service, providing a product or service, providing information, viewing information, performing an action, telling a friend about a product or service.

Note that there are many other types of activities and that some activities do not fit clearly into any one category. The discussion below provides examples of each of these basic types of activities.

Examples of purchasing a product or service include signing up for a magazine subscription, buying $20 worth of books from Amazon.com, signing up for a warranty.

Examples of using a product or service include receiving a new credit card, using a new long distance telephone provider, printing at least 100 pages per week from an HP laser printer, receiving 3 free issues of a magazine.

Examples of providing a product or service include providing legal advice, medical advice, donating an old television set.

Examples of selling a product or service selling a used product on eBay, providing tax advice at a rate of $10 per hour.

Examples of providing information answering survey questions, providing product ratings and reviews, indicating demographic information, purchasing information.

Examples of viewing information include watching a television commercial or other advertisement, listening to an audio tape about the health dangers of smoking cigarettes, reading a pamphlet that explains how to use a product.

Examples of performing an action include playing a game of chance or a game of skill, applying for a credit card, performing a repeated action (e.g. purchasing a product from a retailer at least once a month for the duration of an insurance policy, maintaining a balance on a credit card), performing a customer-segmenting activity (i.e. an activity that allows a seller to segment its customer base), convincing another party (e.g., another player) to perform one or more activities.

Examples of gambling-related activities include playing a game for a designated period of time, playing a designated number of games (e.g., 200 handle pulls at a slot machine), placing a designated number (or dollar value) of bets, winning a designated number of games, winning a designated jackpot, winning a designated amount of money, playing a designated game, playing a game at a designated slot machine, playing a game in a designated fashion (e.g., always make the maximum bet, always hit with 16 in blackjack), signing up for a player tracking card, providing gambling-related information (e.g., inserting a player tracking card, answering survey questions).

In addition, an activity may include an expiration condition. Examples include: an activity must be finished by a designated time (e.g., before 6 PM tonight), an activity must be started before a designated event (e.g., before the end of a baseball game), an activity must be performed before a designated occurrence (e.g., before another player wins a jackpot of $100 or more), an activity must be performed before a designated condition is true (e.g., while there are at least 4 players at a particular bank of slot machines).

An activity may include a time-based requirement. Examples include: an activity must be finished by a designated time (e.g., before 6 pm tonight), an activity must be started after a designated event (e.g., after eating dinner), an activity must take place during a designated time period (e.g., between 4 am and 8 am).

In addition, there may be restrictions as to how and where an activity is performed. Examples include: an activity must be performed while a player is at the casino.

Note that a player may have to perform multiple activities in order to receive a benefit. For example, a player may have to play 100 hands of video blackjack today and eat lunch at the casino buffet tomorrow, a player have to perform a repeated activity (e.g., purchasing a product from a retailer at least once a month for duration of an insurance policy, maintaining a balance on a credit card).

According to one embodiment, a player's completion of an activity may be based on activities of other players. Examples include: a player may perform a competitive activity (i.e., an activity where success is determined relative to at least one other player), a player may perform a team activity (i.e., an activity where players work together to accomplish a common goal).

According to one embodiment, the player may have to perform one of a plurality of activities. This means that the player may have a choice of what activity to perform. For example a player may required to either gamble continuously for the next hour or buy a ticket to a boxing match. If the player performs either activity, then he will receive a benefit.

According to one embodiment, a player may receive help in performing an activity. In this case, one or more other parties may perform an activity in the place of the player. For example, a player may be required to perform an activity of playing a slot machine continuously for 4 hours. The player may enlist three friends to help him perform this activity—each person plays the slot machine for one hour, and then gives up his seat to the next person.

As another example, a player may be required to perform an activity of signing up for 3 magazine subscriptions. As it turns out, the player is only interested in receiving two magazines: Scientific American and Soap Opera Digest. Fortunately, the player's friend also wants a subscription to Scientific American. Together, they sign up for 3 magazine subscriptions, and the player receives the benefit.

As another example, a player may be required to perform an activity of completing a Tae-Bo workout. This player doesn't enjoy Tae-Bo, but his wife does. So the player's wife performs the activity of completing the Tae-Bo workout. Alternatively, it may not be permissible for a player to receive help in performing an activity.

According to one embodiment, it may be permissible for an activity to have been performed in the past. For example, a player may be asked to perform an activity of placing at least $100 worth of bets at video poker. If the player has already placed $150 worth of bets at video poker, then this may constitute performance of the activity. Note that a player may be asked to provide evidence that he performed an activity in the past (e.g., by inserting his player tracking card or providing a receipt).

According to one embodiment, it may be permissible for a player to make a forward commitment to perform an activity. According to one embodiment, a forward commitment is an agreement to perform an activity at some point in the future. For example, a player may be required to perform an activity of test-driving a Ford Escort. The player may agree to perform this activity later (e.g., once he returns home from visiting the casino), thereby completing the activity. A benefit may then be provided to the player's friend. Note that forward commitments may include time-based requirements and expiration conditions.

According to one embodiment, a forward commitment may be penalty-secured. This means that a player may be penalized for not completing the activity specified in the forward commitment. For example, a player's credit card may be charged $100 if he does not complete an activity by a specified date. Examples of penalties include monetary penalties that may be charged to a player's credit card, debit card, player account or other financial account. According to one embodiment, a player may be required to provide a payment identifier (e.g., a credit card number) when signing up for a penalty-secured forward commitment. Other examples of penalties include denial of products or services (e.g., the player may not be permitted to gamble at the casino any more), the player may be required to perform one or more additional activities, and other forms of consideration Penalty-securing a forward commitment may be necessary to avoid a number of different methods of cheating the system. For example, if a forward commitment was not penalty secured, then a player may promise to perform an activity, receive a benefit, and then never perform the activity as promised.

In exchange for performing an activity a player may receive a benefit. A variety of different benefits are possible, including, money (e.g., money or slot machine credits), products (e.g., a souvenir watch, a sweatshirt, a magazine subscription), services (e.g., a free meal, a haircut), discounts on products or services (e.g., 50% off the list price of a hotel room), alternate currencies (e.g., comp points, non-convertible casino chips), an entry into a game of chance (e.g., a lottery ticket, a free spin on a slot machine), other consideration.

Note that determining a benefit may also include determining the value of the benefit. For example, the controller may determine the value of a benefit based on factors like a player's current credit balance on a game machine, or an amount of money that a player has lost during a period of time.

Money may be provided to a player in a variety of different ways, including: as a lump sum payment (e.g., through a check), as a recurring payment (e.g., $100 a month for the next 3 months), by crediting a player's financial account (e.g., bank account, credit card account, casino player account).

According to one embodiment, a benefit may be provided using a game machine. For example, a player may receive a benefit of 50 credits on a slot machine that he is operating. Additional functionality on a game machine may be enabled as a benefit. For example, a player may receive a benefit of being able to bet 5 coins per hand on a video poker machine that usually only lets players bet 3 coins per hand. Odds or payout tables for a game machine may be altered to provide a benefit to a player. A game machine may include a product dispenser that dispenses a product to a player (e.g., a coupon, a gift certificate, tickets to a show or sporting event). A hopper on a game machine may dispense coins to a player.

According to one embodiment, a benefit may be provided using a communication device. Examples include: a player may use a telephone on a game machine (i.e., a communication device) to make long distance phone calls to his friends and family. A broadcast of a championship boxing match may be transmitted to a closed circuit television that is operated by a player. A communication device may include a product dispenser that dispenses a product to a player (e.g., a coupon, a gift certificate, tickets to a show or sporting event).

According to one embodiment, a benefit may be provided to a party associated with the player (e.g., a friend of the player, a family member, a charity). While providing a benefit a player's favorite charity may not provide a tangible benefit to the player, the player does receive an intangible benefit (e.g., he may feel altruistic and good-hearted). For this reason, benefits to friends of players may be particularly motivational for a player. According to one embodiment, a benefit provided to a friend of a player may be contingent on the friend performing one or more activities. For example, a player's friend may be asked to perform an activity in order to receive a benefit.

According to one embodiment, the controller may determine whether a player has performed an activity designated by an offer. This may be helpful when determining whether to provide a benefit to the player (since this benefit will typically not be provided if a player fails to perform the activity).

The method of determining whether an activity is performed is often dependent on the type of activity that a player has been prompted to perform. For example, if a player is prompted to perform an activity of making 100 handle pulls at a slot machine, then the controller may monitor the number of handle pulls that the player has made at the slot machine. Examples of ways that the controller may determine whether an activity has been performed include: receiving information from a casino rep (e.g., a casino rep may indicate that a player has filled out an application for a new credit card or agreed to purchase a magazine subscription), receiving information form the player (e.g., when a player performs an activity of making a forward commitment to test drive an automobile), receiving information from one more other computer systems (e.g., if a player is required to perform an activity of signing up for a new credit card, then the controller may receive information from a credit bureau), monitoring a player's activities at one or more slot machines (e.g., by communicating with a slot machine through a communication network), storing data regarding a player's gambling activities (e.g., in the player database shown in FIG. 5), receiving information from one or more slot machines, receiving information from one or more point-of-sale terminals (e.g., for activities in which the player is required to purchase a product or service), monitoring conditions related to the activity (e.g., monitoring the current time if the activity has an expiration date)

Note that in many cases, the activity to be performed by a player comprises making an agreement or forward commitment (e.g., agreeing to purchase a product or service). In this case, the player may complete the activity just by making the agreement, and have the benefit provided to him almost immediately.

According to one embodiment, a player may use an authentication code to prove that he performed one or more activities. This authentication code may be an alphanumeric code, password, or other information that provides the controller with a reasonable assurance that the player performed one or more activities as required. According to one embodiment, an authentication code is produced using a cryptographic algorithm (e.g., a cryptographic hash function). Typically an authentication code is produced by a device that has the ability to determine whether a player performed an activity. For example, a slot machine may output an authentication code indicating that a player made 100 handle pulls at that slot machine. An authentication code may be output using an output device (e.g. a printer, a video monitor).

According to one embodiment, the controller may have incomplete information as to whether a player performed an activity. For example, a dealer at a casino may be responsible for verifying that a player has gambled at least $300 at blackjack, but the dealer may forget to perform this job. In this case, the controller may resolve this situation in one of a variety of different ways, including: assume that the player did in fact complete the activity and provide the benefit to the player, assume that the player did not complete the activity and not provide the benefit to the player, provide a reduced or alternative benefit to the player, offer to allow the player to perform a second activity to earn the benefit, ask other employees (or even other players) whether the activity was completed.

According to one embodiment, a player may be reminded of an offer while performing an activity. Examples include: a video screen on a slot machine may display a message to the player telling him how much longer he has to gamble before he earns a benefit, an animated character in a video game may remind the player that if he continues to play the game well, he may be able to win a benefit, a casino rep may use a communication device to communicate with a player and remind him to perform an activity. Similarly, a casino rep may remind player of a benefit that he may receive for performing the activity, or other terms of an accepted offer.

According to one embodiment, the controller may indicate to the player whether or not he has performed an activity. Examples include: A slot machine that is being operated by the player may display a text message, "Nice work! You just won a subscription to People magazine.", a strobe light on top of a video poker machine may flash and an audio speaker may proclaim to a player, "Whoops! You just missed your opportunity to earn 100 comp points.", a video monitor on a slot machine may display a message, "You're not done yet! If you play 113 more handle pulls at this slot machine, then you'll win a pair of tickets to Wrestlemania." The controller may prompt a casino rep to communicate with the player. For example, a casino rep may use a communication device to congratulate a player on performing an activity correctly.

According to one embodiment, if a player performs an activity specified in an offer, then he may receive a benefit.

According to one embodiment, a benefit provided to a player may be determined based on the activity performed. Examples include: the benefit may be based on what activity is performed. For example, a player may be given a choice of gambling for 3 hours at a slot machine or gambling for 3 hours at a video poker machine. If the player gambles for 3 hours at the slot machine, then he earns tickets to a musical. If the player gambles for 3 hours at a video poker machine, then he earns tickets to a boxing match. The benefit may be based on how well an activity is performed. For example, a player may be given the opportunity to earn 5 comp points for every survey question he answers. If the player answers 12 survey questions, then he earns 60 comp points.

A benefit may be provided by a variety of different parties, including: the controller (e.g., by crediting a player's financial account), the casino (e.g., a casino employee may mail a check), the casino rep (e.g., the casino rep may give a player 500 credits), another party (e.g., a subsidizer, a product manufacturer, a service provider).

While the above methods of providing benefits to a player may result from the acceptance by a player of one or more offers, it should also be noted that the casino may provide benefits to players without the requirement that they accept an offer. For example, a premium player on the floor who has been playing for more than two hours may trigger the controller to identify the player and have a casino rep communicate with the player and provide him a comp such as a free dinner or show.

According to one embodiment, a player may not perform the activity specified in an offer. The controller may respond to this occurrence in at least one of a variety of ways, including: not providing the benefit to the player, providing a reduced or alternative benefit to the player, offering to allow the player to perform a second activity to earn the benefit, not providing offers in the future to that player.

According to one embodiment, a player may be penalized if he does not perform an activity specified in an offer. For example, the controller may output an offer to the player in which the player gets $15 if he pulls the handle of a slot machine 100 times. However, if the player accepts this offer and does not spin the slot reel 100 times, then the player will be penalized $15. Similarly, a player's performance of an activity may be penalty-secured.

According to one embodiment, a casino or other party operating the controller may receive a subsidy based on communication between a casino rep and a player. For example, a magazine publisher may pay a casino $0.50 if a casino rep signs a player up for a free trial subscription to a magazine.

A variety of different subsidizers (i.e., parties that provide subsidies) are possible, including: product manufacturers (which wants a casino rep to advertise a product to a player or attempt to sign a player up for a free trial of the product), service providers (which want a casino rep to convince players to sign up for a service), advertising agencies (e.g., an advertising agency may want a casino rep to promote products or services to players).

A subsidy may any form of consideration, including money, products, and services. Also, note that a subsidy of money may be provided in a variety of different ways, including: as a lump sum payment (e.g., through a check), as a recurring payment. For example, a subsidizer may pay a casino $10,000 to have players view 100,000 hours of advertisements, by crediting a casino's financial account (e.g., bank account, a company account), en mass. For example, a subsidizer may provide a plurality of subsidies to a casino through a single money transfer.

Note that a subsidy may be provided at various different times including before, after or substantially simultaneously to communication between a player and a casino rep.

A subsidy may be provided based on factors such as: an amount of communication (see examples below), player behavior resulting from communication with a casino rep (see examples below), a subject of communication between a casino rep and a player, an offer presented by a casino rep, acceptance or rejection of an offer by a player (e.g., acceptance rates, total number of acceptances), an activity performed by a player (e.g., what activity is performed, when it is performed).

A subsidy may be provided based on an amount of communication. Examples include: how long a casino rep communicates with a player, how many times a casino rep communicates with a player, how much at least one casino rep communicates with at least one player.

A subsidy may be provided based on player behavior resulting from communication with a casino rep. For examples, a subsidy may be provided based on: a player purchasing at least one product or service (e.g., a subsidy may be provided if a player switches his long distance telephone service provider), a player's gaming activities (e.g., a subsidy may be provided if a player's theoretical win per hour increases after a casino rep tutors the player on how to operate a game machine), a player indicating interest in at least one product or service (e.g., a subsidy may be provided if a player visits a subsidizer's website), or a friend or associate of a player performing an activity. In such an embodiment, a player may have recommended or otherwise advised his friend or associate to perform the activity. For example, a subsidy may be provided if 2 friends of a player also sign up for free magazine subscriptions.

Note that a wide variety of other factors are possible, including factors described herein.

According to one embodiment, the controller may determine a value of a subsidy to be provided by a subsidizer. For example, the controller may determine that 400 offers were presented to players by casino reps, meaning that a subsidizer owes $100 to the casino or another party operating the controller.

Values of subsidies may be based on a variety of factors, such as those described above and elsewhere in this disclosure.

According to one embodiment, the controller may track subsidies to be provided by subsidizers. For example, the controller may store a subsidy database (not shown) that tracks how much at least one subsidizer owes.

According to one embodiment, the controller may communicate with at least one subsidizer to determine information about subsidies. For example, the controller may negotiate with merchants to develop offers, develop the language of the offers, select casino reps to present the offers, and handle back office billing and penalties associated with the offers. In addition, the controller may store information about subsidizers in a subsidizer database (not shown).

According to one embodiment, a subsidizer may provide a subsidy to a casino. Alternatively, or in addition, a subsidizer may provide a subsidy to one or more other parties, including: a player, a casino rep who communicates with a player, a party who operates the controller (e.g., in an embodiment in which the casino does not operate the controller).

According to one embodiment, a portable communication device may be provided to a player by a casino or other party. According to one embodiment, a player may obtain a communication device in a variety of different ways, including: borrowing a communication device, renting or leasing a communication device, purchasing a communication device, a communication device may be given to a player free of charge, a player may supply his own communication device.

According to one embodiment, a player may obtain a communication device from a variety of different parties, including: a casino (e.g., a player may borrow a communication device from the front desk at a casino), a merchant (e.g., a player may purchase or rent a communication device from a merchant that maintains a shop in casino).

According to one embodiment, a player may provide a player identifier when obtaining a communication device. Examples of player identifiers include: a player's name (e.g., first name, last name), a player's home address, a player's home telephone number, a player tracking card number, a player's hotel room number (e.g., if a player is staying at a hotel that is associated with a casino), a player's email address, a payment identifier belonging to the player.

Note that obtaining a player identifier from a player may: help in monitoring game play by the player, help to deter players from stealing communication devices.

According to one embodiment, a player may provide a payment identifier when obtaining a communication device. Examples of payment identifiers include: a credit card number, a debit card number, a financial account number (e.g., a bank account number), a home billing address, a player's hotel room number (e.g., if a player is staying at a hotel that is associated with a casino).

Note that obtaining a payment identifier a player may: be useful in obtaining a payment from a player (e.g., a rental or lease payment for using a communication device), help to prevent players from stealing communication devices. For example, if a player does not return a communication device, then a casino may charge his payment identifier for the cost of the communication device.

According to one embodiment, a player may provide a security deposit other consideration to obtain a communication device. According to one embodiment, a security deposit may be any form of consideration (e.g., money, alternate currencies, products, services). According to one embodiment, a security deposit may be returned to a player if the player returns the communication device. Note that obtaining security deposits from players may help to prevent players from stealing communication devices.

According to one embodiment, a player may provide consideration to rent, lease, or purchase a communication device. Different types of consideration include: money, an alternate currency (e.g., casino chips, game tokens), a player may perform a value-added activity (e.g., answering a plurality of survey questions), other forms of consideration (e.g., products, services)

According to one embodiment, a player may borrow or rent a communication device, as described herein. In one embodiment, a player who borrows or rents a communication device may return the communication device. Examples include: a player may return a communication device to a casino desk, a player may drop a communication device into a deposit bin next to an exit of a casino, a player may signal for a casino employee to visit a slot machine where he is gambling and retrieve a communication device that he is finished using.

According to one embodiment, a player may be asked to return a communication device according to various conditions. Examples of conditions include: a communication device must be in working order when it is returned, a communication device must be returned during a specified time period, a communication device must be returned at a specified location, a communication device must have been used in a prescribed manner (e.g., a player may be required to use a communication device for at least 50% of the time that the device is in his possession. This may prevent players from borrowing communication devices and then not using them.)

According to one embodiment, a player may receive a benefit for returning a communication device. For example, a security deposit may be refunded based on a player returning a device. In a second example, a player may receive a ticket for a free luncheon buffet in exchange for using and returning a communication device. According to one embodiment, a benefit may only be provided to a player if a condition is true (e.g., the player returned the device on time, the player used the device for at least 80% of the time that he borrowed it).

According to one embodiment, a player who does not return a communication device may be charged a penalty fee or be asked to provide other consideration. For example, a player's credit card may be charged for the price of a communication device if the player does not return the communication device. According to one embodiment, a penalty may be levied to a player if a condition is true (e.g., the player returned a device late, the player used the device for less than 10% of the time that he borrowed it).

According to one embodiment, a player may not be required to return a communication device, as described above. For example, a communication device may belong to a player (e.g., a player may use his PDA as a communication device), or be disposable (e.g., a disposable cell phone).

It is worthwhile to note that the invention may also apply to devices other than game machines. For example, a player may operate an automatic teller machine (ATM) at a casino to obtain money to pay for gaming, shopping, entertainment, or other activities at the casino.

An ATM machine may include a communication device that enables a player to communicate with a casino rep and receive a service from the casino rep. For example, a player may use a telephone on an ATM machine to converse with casino rep, receive an offer from the casino rep, and accept the offer. The ATM machine may then provide a benefit to the player (e.g., by dispensing cash to the player).

Although the present invention has been described with respect to a preferred embodiment thereof, those skilled in the art will note that various substitutions may be made to those embodiments described herein without departing from the spirit and scope of the present invention.

What is claimed is:

1. A non-transitory computer readable medium encoded with instructions for directing a processor to:

determine that a triggering event has occurred in association with at least one gaming activity at a gaming device, said at least one gaming activity including at least one random determination of a game outcome;

in response to the determination that the triggering event has occurred, determine whether or not to enable a player associated with the gaming device to make an input to request at least one of a product or a service to be offered;

if the determination is to enable the player to make the input to request the at least one of a product or a service to be offered and the player makes said input:

(a) determine an individual to communicate with the player;

(b) determine, based on the at least one gaming activity, the at least one of a product or a service to be offered to the player;

(c) transmit, to the individual, data representing the determined at least one of a product or a service to be offered; and (d) enable communication between the player and the individual via a portable communication device;

if the determination is to enable the player to make the input to request the at least one of a product or a service to be offered and the player does not make said input, do not offer any product or any service to the player in association with the determination; and if the determination is to not enable the player to make the input to request the at least one of a product or a service to be offered:

(a) do not enable the player to make said input; and (b) do not offer any product or any service to the player in association with the determination.

2. The computer readable medium of claim 1, wherein instructions direct the processor to obtain a player identifier from the player, the player identifier comprising a name of the player.

3. The computer readable medium of claim 2, wherein the player identifier comprises an address of the player.

4. The computer readable medium of claim 2, wherein the player identifier comprises a phone number of the player.

5. The computer readable medium of claim 2, wherein the player identifier comprises a tracking card of the player.

6. The computer readable medium of claim 2, wherein the player identifier comprises a hotel room number of the player.

7. The computer readable medium of claim 2, wherein the player identifier comprises an email address of the player.

8. The computer readable medium of claim 2, wherein the player identifier comprises a payment identifier of the player.

9. The computer readable medium of claim 8, wherein the payment identifier comprises a credit card number.

10. The computer readable medium of claim 8, wherein the payment identifier comprises a debit card number.

11. The computer readable medium of claim 8, wherein the payment identifier comprises a financial account number.

12. The computer readable medium of claim 8, wherein the payment identifier comprises a home billing address.

13. A non-transitory computer readable medium encoded with instructions for directing a processor to:

monitor at least one gaming activity of a player at a gaming device, said at least one gaming activity including at least one random determination of a game outcome;

determine that a triggering event has occurred in association with said monitored at least one gaming activity;

in response to the determination that the triggering event has occurred, determine whether or not to enable the player to make an input to request at least one of a product or a service to be offered;

if the determination is to enable the player to make the input to request the at least one of a product or a service to be offered and the player makes said input:

(a) determine the at least one of a product or a service to be offered to the player;

(b) transmit, to an individual, data representing the determined at least one of a product or a service to be offered; and (c) enable communication between the player and the individual via a portable communication device;

if the determination is to enable the player to make the input to request the at least one of a product or a service to be offered and the player does not make said input, do not offer any product or any service to the player in association with the determination; and if the determination is to no enable the player to make the input to request the at least one of a product or a service to be offered:

(a) do not enable the player to make said input; and (b) do not offer any product or any service to the player in association with the determination.

14. The computer readable medium of claim 13, further encoded with instructions for directing the processor to:

enable the individual to provide a service to the player.

15. The computer readable medium of claim 13, further encoded with instructions for directing the processor to:

alter the state of the gaming device based on an input received from the individual.

* * * * *

UNITED STATES PATENT AND TRADEMARK OFFICE

CERTIFICATE OF CORRECTION

PATENT NO. : 7,972,213 B2
APPLICATION NO. : 10/655969
DATED : July 5, 2011
INVENTOR(S) : Jay S. Walker et al.

It is certified that error appears in the above-identified patent and that said Letters Patent is hereby corrected as shown below:

IN THE CLAIMS:

In Claim 2, column 34, line 62, after “wherein” add --the--.

In Claim 13, column 36, line 16, replace “no” with --not--.

Signed and Sealed this
Twenty-seventh Day of September, 2011

David J. Kappos

David J. Kappos
*Director of the United States Patent and Trademark Office*